(12) United States Patent
Williams et al.

(10) Patent No.: US 11,062,410 B2
(45) Date of Patent: Jul. 13, 2021

(54) SYSTEM AND METHOD FOR STUDENT ATTENDANCE MANAGEMENT

(71) Applicant: SCHOOL INNOVATIONS & ACHIEVEMENT, INC., El Dorado Hills, CA (US)

(72) Inventors: Jeffrey C Williams, El Dorado Hills, CA (US); Susan Cook, Rio Linda, CA (US)

(73) Assignee: SCHOOL INNOVATIONS & ACHIEVEMENT, INC., El Dorado Hills, CA (US)

( * ) Notice: Subject to any disclaimer, the term of this patent is extended or adjusted under 35 U.S.C. 154(b) by 0 days.

(21) Appl. No.: 15/702,406

(22) Filed: Sep. 12, 2017

(65) Prior Publication Data

US 2018/0005330 A1    Jan. 4, 2018

Related U.S. Application Data

(63) Continuation-in-part of application No. 15/343,039, filed on Nov. 3, 2016, and a continuation-in-part of
(Continued)

(51) Int. Cl.
*G06Q 50/20* (2012.01)
*G06Q 10/06* (2012.01)
(Continued)

(52) U.S. Cl.
CPC ..... *G06Q 50/205* (2013.01); *G06Q 10/06311* (2013.01); *G06Q 10/109* (2013.01);
(Continued)

(58) Field of Classification Search
None
See application file for complete search history.

(56) References Cited

U.S. PATENT DOCUMENTS

| 2002/0178038 A1* | 11/2002 | Grybas | G09B 19/00 705/326 |
| 2003/0061068 A1* | 3/2003 | Curtis | G06Q 30/0607 705/26.25 |

(Continued)

OTHER PUBLICATIONS

School attendance improvement and truancy reduction by Pennsylvania Department of Education (Feb. 2015) (retrieved from https://1.cdn.edl.io/UbpaOxyxPZCYTvrUOQUvkXWBk2je1WbxoB6S1U0sc8sFtaBv.pdf) (Year: 2015) (Year: 2015).*

*Primary Examiner* — Sujay Koneru
(74) *Attorney, Agent, or Firm* — Inventive Law Inc.; Jim H. Salter

(57) ABSTRACT

A system and method for student attendance management are disclosed. A particular embodiment includes: installing a site-resident data collection module in a site location; using the site-resident data collection module to collect student information, attendance data, and other site data from the site location; transferring the site data to a host location; performing data transformation and normalization operations on the site data to convert the site data to a common format, the data transformation and normalization operations including district-specific data transformation rules; performing district configuration operations to configure rules specifying how and when alerts can be sent to recipients based on the site data; performing scheduling and reporting operations to generate and distribute alerts, including attendance letters, to recipients based on the site data and the configured rules; and performing scheduling of multiple individual conferences via a block conferencing feature provided by a user interface.

14 Claims, 20 Drawing Sheets

Related U.S. Application Data application No. 14/250,314, filed on Apr. 10, 2014, now Pat. No. 9,767,440.

(51) Int. Cl.
*G06Q 10/10* (2012.01)
*G06Q 50/00* (2012.01)
*G09B 5/02* (2006.01)
*G09B 7/00* (2006.01)
*G09B 5/00* (2006.01)

(52) U.S. Cl.
CPC ......... *G06Q 10/1095* (2013.01); *G06Q 50/20* (2013.01); *G09B 5/00* (2013.01); *G09B 5/02* (2013.01); *G09B 7/00* (2013.01)

(56) References Cited

U.S. PATENT DOCUMENTS

| | | | |
|---|---|---|---|
| 2003/0154118 A1* | 8/2003 | Druyan | G06Q 30/02 705/7.13 |
| 2003/0198930 A1* | 10/2003 | Stuppy | G09B 7/00 434/322 |
| 2004/0110119 A1* | 6/2004 | Riconda | G09B 7/02 434/350 |
| 2004/0162707 A1* | 8/2004 | Saint-Amour | G16H 50/30 702/189 |
| 2005/0091368 A1* | 4/2005 | Ozburn | H04L 63/083 709/224 |
| 2005/0233294 A1 | 10/2005 | Keitch | |
| 2006/0127870 A1 | 6/2006 | Fields et al. | |
| 2007/0033082 A1* | 2/2007 | Hilliard | G06Q 10/06393 705/500 |
| 2007/0134642 A1 | 6/2007 | Chuah | |
| 2008/0014569 A1* | 1/2008 | Holiday | G09B 3/00 434/351 |
| 2008/0040502 A1* | 2/2008 | Holsberry | G06Q 50/20 709/232 |
| 2008/0228747 A1* | 9/2008 | Thrall | G06Q 50/20 |
| 2008/0263010 A1* | 10/2008 | Roychoudhuri | G11B 27/031 |
| 2009/0253110 A1* | 10/2009 | Hurtado | G09B 7/00 434/307 R |
| 2012/0150797 A1* | 6/2012 | Landy | G06F 16/254 707/610 |
| 2012/0233083 A1* | 9/2012 | Strodtman | G06Q 10/06 705/326 |
| 2013/0024492 A1* | 1/2013 | Graff | G09B 7/00 709/202 |
| 2013/0024524 A1* | 1/2013 | Graff | G06Q 10/107 709/206 |
| 2014/0234826 A1* | 8/2014 | Breznitz | G09B 7/00 434/362 |
| 2015/0120362 A1 | 4/2015 | Whorley | |
| 2015/0294274 A1 | 10/2015 | Williams | |
| 2015/0296347 A1 | 10/2015 | Roth | |
| 2016/0247122 A1* | 8/2016 | Wong | G06Q 10/1095 |
| 2016/0293025 A1* | 10/2016 | Marr | G06Q 10/109 |

* cited by examiner

Got New Triggers

```
        ┌─────────────────────────────┐
        │      A2A Configurator       │
        └──────────────┬──────────────┘
                       ▼
        ┌─────────────────────────────┐
        │  District wide Configuration│
        └──────────────┬──────────────┘
                       ▼
        ┌─────────────────────────────┐
        │          Triggers           │
        └──────────────┬──────────────┘
                       ▼
        ┌─────────────────────────────┐
        │       Got New Triggers      │
        └──────────────┬──────────────┘
                       ▼
   ┌────────────────────────────────────────┐
   │ User enters in the Number of "Got New" │
   │ Absences occurring after the conference│
   │ date that triggers the next letter     │
   └────────────────────────────────────────┘
```

Figure 12

Additional Student Filters

Attendance Summary Report

Changes to Optional Letter Configuration

Selecting Prior Optional Letter Run

From the Optional letter dashboard, the user selects the "new" button to display the configuration page. From here the user can select a previous optional letter run from the drop down "follow up letter to."

Selecting and running a follow up letter will affect the previous student list in the following ways:
Remove students who are no longer active
Update guardian address fields with any changes
Provide student attendance information.

Figure 20

SYSTEM AND METHOD FOR STUDENT ATTENDANCE MANAGEMENT

PRIORITY PATENT APPLICATIONS

This is a continuation-in-part patent application of U.S. patent application Ser. No. 15/343,039; filed Nov. 3, 2016 by the same applicant; which is a continuation-in-part patent application of U.S. patent application Ser. No. 14/250,314; filed Apr. 10, 2014 by the same applicant. The present patent application draws priority from the referenced patent applications. The entire disclosure of the referenced patent applications is considered part of the disclosure of the present application and is hereby incorporated by reference herein in its entirety.

TECHNICAL FIELD

This patent application relates to computer-implemented software and networked systems, according to one embodiment, and more specifically to a system and method for student attendance management.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2012-2017 School Innovations & Achievement Inc., All Rights Reserved.

BACKGROUND

In recent years, numerous states have passed laws requiring school districts to more closely monitor student attendance and truancy. This includes monitoring students who are chronically truant and frequently absent from the classroom. Many school districts are instituting new policies regarding permitted absenteeism and redefining unacceptable truancy. These laws and policies require that schools take certain specified actions immediately upon a student reaching a threshold of unacceptable truancy. However, due to lack of funding, shortage of personnel, and lack of availability of sophisticated technology, most schools and school districts are ill-equipped to compare, analyze and measure the effectiveness with the goal of improving student attendance.

Additionally, each school within a school district can track attendance in a different manner, using different absence codes. Further, schools across a school district do not always label an "unexcused absence" as recognized by state law or school district policy as an absence, but rather as a tardy, late arrival, early dismissal, and medical excuse without documentation, among others. Such variance among attendance tracking also makes it nearly impossible for school districts to correctly track truancy and take appropriate, timely action as required by their own policies and by state law.

Finally, monetary incentives, reimbursements and other funding for schools are often linked in one way or another to student enrollment and attendance. Thus, districts unable to implement systems for reliable and continuous attendance tracking will be unable to maximize the monetary benefits received.

BRIEF DESCRIPTION OF THE DRAWINGS

The various embodiments are illustrated by way of example, and not by way of limitation, in the figures of the accompanying drawings in which:

FIG. 12 is an operational or processing flow chart illustrating an example embodiment of a method as described herein for configuring the Got New Triggers feature;

FIG. 20 is an operational or processing flow chart illustrating an example embodiment of a method as described herein for effecting changes to optional letter configurations.

DETAILED DESCRIPTION

Figure 1:
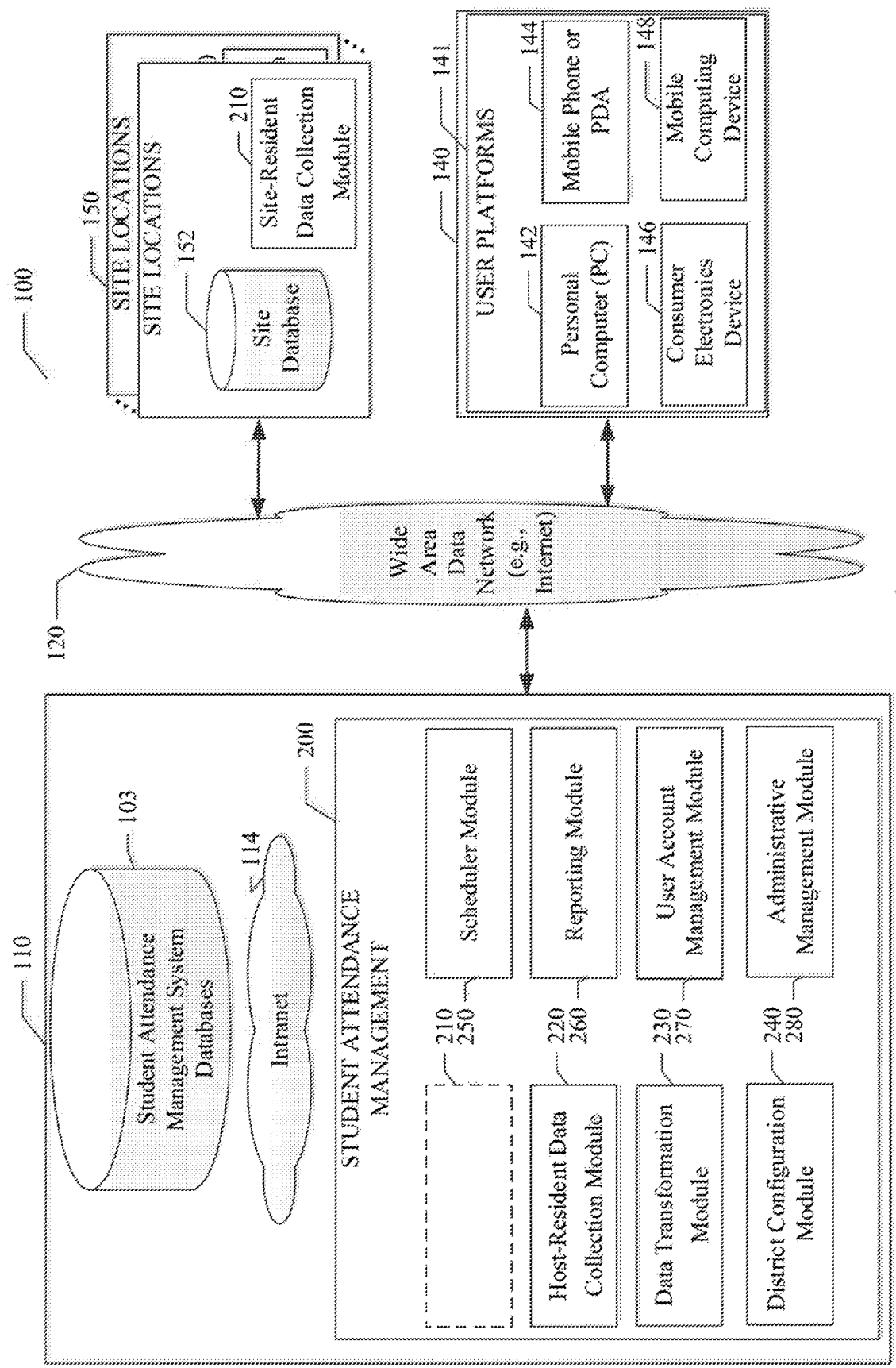
FIG. 1 illustrates an example embodiment of a student attendance management system in a network-enabled ecosystem.

In the following description, for purposes of explanation, numerous specific details are set forth in order to provide a thorough understanding of the various embodiments. It will be evident, however, to one of ordinary skill in the art that the various embodiments may be practiced without these specific details.

In the various embodiments described herein, a system and method for student attendance management are disclosed. The various embodiments provide the ability to detect chronic absenteeism early, and then intervene or deter chronic absenteeism before it affects monetary distributions or results in drop out, which would otherwise result in decreased enrollment (also negatively impacting a school's financial resources). The various embodiments also standardize absence records of all schools within a school district and all districts in a given area, automatically track absences on a daily basis, and provide automatic and prompt notification when an individual student's truancy reaches a threshold requiring a response.

In various embodiments described in detail below, a software application program is used to gather, process, and distribute school information, including attendance data, using a computer system, a web appliance, and/or a mobile device. As described in more detail below, the computer or computing system on which the described embodiments can be implemented can include personal computers (PCs), portable computing devices, laptops, tablet computers, personal digital assistants (PDAs), personal communication devices (e.g., cellular telephones, smartphones, or other wireless devices), network computers, set-top boxes, consumer electronic devices, or any other type of computing, data processing, communication, networking, or electronic system.

Overview of an Example Embodiment

An example embodiment as described herein is a student attendance management network focused on the gathering, processing, and distribution of school information, including attendance data. The processing of the school district data can prevent or substantially reduce future K-12 student absences. In the embodiments described herein, there is a consistent, defined process that when followed, dramatically reduces the number of student absences. This process uses a combination of student data collected at the school sites, customized database scripts, custom application code, and letter printing processes. This process as a whole is referred to as Attention2Attendance or A2A.

In the example embodiments described herein, data is extracted from the school student information systems using a site-resident data collection module. This data can be extracted using pre-defined database select and join statements allowing the relevant student information to be accessed and retrieved. This data is then transferred to a host system using the site-resident data collection module and a host-resident data collection module as described in more detail below.

At the host site, the school student information can be normalized and otherwise transformed into a consistent form. A data transformation module uses customized rules and processes to aggregate the data into a common format. Because each school district can uniquely set up and store their data, this normalization and data transformation process is specific for each district. The normalized data is then uploaded into host databases. This upload can use standard database scripts and processes. The databases described herein can be implemented using well-known applications or systems, such as Microsoft® Access or Excel, SQL, spreadsheets, tables, flat files, or any other type of structured data storage.

Once the normalized school student information is resident in the host database, the scheduler and reporting modules of an example embodiment can be used to generate notifications based on prescribed rules. In a particular embodiment, specific rules and alerts can be set up within the student attendance management system to identify trends, events, and instances when a student, a school, or a district should be notified of an identified situation. These notifications are the drivers for improving school attendance. The specific rules and alerts can be pre-defined within the student attendance management system application. These rules and alerts can be customized to address specific school district needs if requested. In some cases, some notifications can be suppressed or delayed to implement a pre-defined policy. In most cases, the notifications are sent on regular intervals to ensure consistency. A district configuration module can be used to specify the particular rules and processes used to generate and distribute notifications. For example, the manner of distribution (e.g., physical letter, email, or the like) can be pre-defined in a configurable way.

Detail of an Example Embodiment

Referring now to FIG. 1, in an example embodiment, a system for student attendance management 100 in a network-enabled ecosystem is disclosed. In various example embodiments, an application or service, typically provided by or operating on a host site (e.g., a website) 110, is provided to simplify and facilitate the downloading or hosted use of the student attendance management system 200 of an example embodiment. In a particular embodiment, the student attendance management system 200, or a portion thereof, can be downloaded from the host site 110 by a user at a user platform 140. Alternatively, the student attendance management system 200 can be hosted by the host site 110 for a networked user at a user platform 140. The details of the student attendance management system 200 of an example embodiment are provided below.

Referring again to FIG. 1, the student attendance management system 200 can be in network communication with a plurality of user platforms 140. The host site 110 and user platforms 140 may communicate and transfer data and information in the data network ecosystem 100 shown in FIG. 1 via a wide area data network (e.g., the Internet) 120. Various components of the host site 110 can also communicate internally via a conventional intranet or local area network (LAN) 114.

In an example embodiment, the student attendance management system 200 can also be in network communication with a plurality of site locations 150. Site locations 150 can represent school district offices or school administrative offices where student information and attendance data is stored in site databases. As conventionally done in existing schools and district offices, student attendance data is recorded in site databases 152. Unfortunately, the attendance data in these site databases can be inaccurate, incomplete, recorded in non-standard data formats, recorded in non-standard data structures or databases, or otherwise rendered very difficult to reconcile and combine with data from other sites. As described in more detail below, the various embodiments disclosed herein can retrieve, reformat, re-structure, and process the site data to produce useful information aggregated among a plurality of districts, schools, and other site locations.

Networks 120 and 114 are configured to couple one computing device with another computing device. Networks 120 and 114 may be enabled to employ any form of computer readable media for communicating information from one electronic device to another. Network 120 can include the Internet in addition to LAN 114, wide area networks (WANs), direct connections, such as through an Ethernet port or a universal serial bus (USB) port, other forms of computer-readable media, or any combination thereof. On an interconnected set of LANs, including those based on differing architectures and protocols, a router and/or gateway device acts as a link between LANs, enabling messages to be sent between computing devices. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communication links known to those of ordinary skill in the art. Furthermore, remote computers and other related electronic devices can be remotely connected to either LANs or WANs via a wireless link, WiFi, Bluetooth, satellite, or modem and temporary telephone link.

Networks 120 and 114 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Networks 120 and 114 may also include an autonomous system of terminals, gateways, routers, and the like connected by wireless radio links or wireless transceivers. These connectors may be configured to move freely and randomly and organize themselves arbitrarily, such that the topology of networks 120 and 114 may change rapidly and arbitrarily.

Networks 120 and 114 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, 4G, and future access networks may enable wide area coverage for mobile devices, such as one or more of client devices 141, with various degrees of mobility. For example, networks 120 and 114 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. Networks 120 and 114 may also be constructed for use with various other wired and wireless communication protocols, including TCP/IP, UDP, SIP, SMS, RTP, WAP, CDMA, TDMA, EDGE, UMTS, GPRS, GSM, UWB, WiFi, WiMax, IEEE 802.11x, and the like. In essence, networks 120 and 114 may include virtually any wired and/or wireless communication mechanisms by which information may travel between one computing device and another computing device, network, and the like. In one embodiment, network 114 may represent a LAN that is configured behind a firewall (not shown), within a business data center, for example.

The student attendance management system can be implemented using any form of network transportable digital data. The network transportable digital data can be transported in any of a group of file formats, protocols, and associated mechanisms usable to enable a host site 110 and a user platform 140 to transfer data over a network 120. In one embodiment, the data format for the user interface can be HyperText Markup Language (HTML). HTML is a common markup language for creating web pages and other information that can be displayed in a web browser. In another embodiment, the data format for the user interface can be Extensible Markup Language (XML). XML is a markup language that defines a set of rules for encoding interfaces or documents in a format that is both human-readable and machine-readable. In another embodiment, a JSON (JavaScript Object Notation) format can be used to stream the interface content to the various user platform 140 devices. JSON is a text-based open standard designed for human-readable data interchange. The JSON format is often used for serializing and transmitting structured data over a network connection. JSON can be used in an embodiment to transmit data between a server, device, or application, wherein JSON serves as an alternative to XML. The HyperText Transfer Protocol (HTTP) or secure HTTP (HTTPS) can be used as a network data communication protocol.

In a particular embodiment, a user platform 140 with one or more client devices 141 enables a user to access data and provide data and/or instructions for the student attendance management system 200 via the host 110 and network 120. Client devices 141 may include virtually any computing device that is configured to send and receive information over a network, such as network 120. Such client devices 141 may include portable devices 144, such as, cellular telephones, smart phones, display pagers, radio frequency (RF) devices, infrared (IR) devices, global positioning devices (GPS), Personal Digital Assistants (PDAs), handheld computers, wearable computers, tablet computers, integrated devices combining one or more of the preceding devices, and the like. Client devices 141 may also include other computing devices, such as personal computers 142, multiprocessor systems, microprocessor-based or programmable consumer electronics, network PC's, and the like. Client devices 141 may also include other processing devices, such as consumer electronic (CE) devices 146 and/or mobile computing devices 148, which are known to those of ordinary skill in the art. As such, client devices 141 may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and many lines of color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and/or send digital information. In other embodiments, mobile devices can be configured with applications (apps) with which the functionality described herein can be implemented.

Client devices 141 may also include at least one client application that is configured to send and receive content data or/and control data from another computing device via a wired or wireless network transmission. The client application may include a capability to provide and receive textual data, graphical data, video data, audio data, and the like. Moreover, client devices 141 may be further configured to communicate and/or receive a message, such as through an email application, a Short Message Service (SMS), direct messaging (e.g., Twitter), Multimedia Message Service (MMS), instant messaging (IM), interne relay chat (IRC), mIRC, Jabber, Enhanced Messaging Service (EMS), text messaging, Smart Messaging, Over the Air (OTA) messaging, or the like, between another computing device, and the like.

As one option, the student attendance management system 200, or a portion thereof, can be downloaded to a user device 141 of user platform 140 and executed locally on a user device 141. The downloading of the student attendance management system 200 application (or a portion thereof) can be accomplished using conventional software downloading functionality. As a second option, the student attendance management system 200 can be hosted by the host site 110 and executed remotely, from the user's perspective, on host system 110. In one embodiment, the student attendance management system 200 can be implemented as a service in a service-oriented architecture (SOA) or in a Software-as-a-Service (SAAS) architecture. In any case, the functionality performed by the student attendance management system 200 is as described herein, whether the application is executed locally or remotely, relative to the user.

Referring again to FIG. 1, the host site 110 and student attendance management system 200 of an example embodiment is shown to include a student attendance management system database 103. The database 103 is used in an example embodiment for data storage of information related to district records, school records, student records, attendance data, letter templates, calendar data, configuration data, scheduling data, reporting data, and the like. It will be apparent to those of ordinary skill in the art that the database 103 can represent multiple datasets and can be used for the storage of a variety of data in support of the student attendance management system 200 of an example embodiment.

Figure 2:
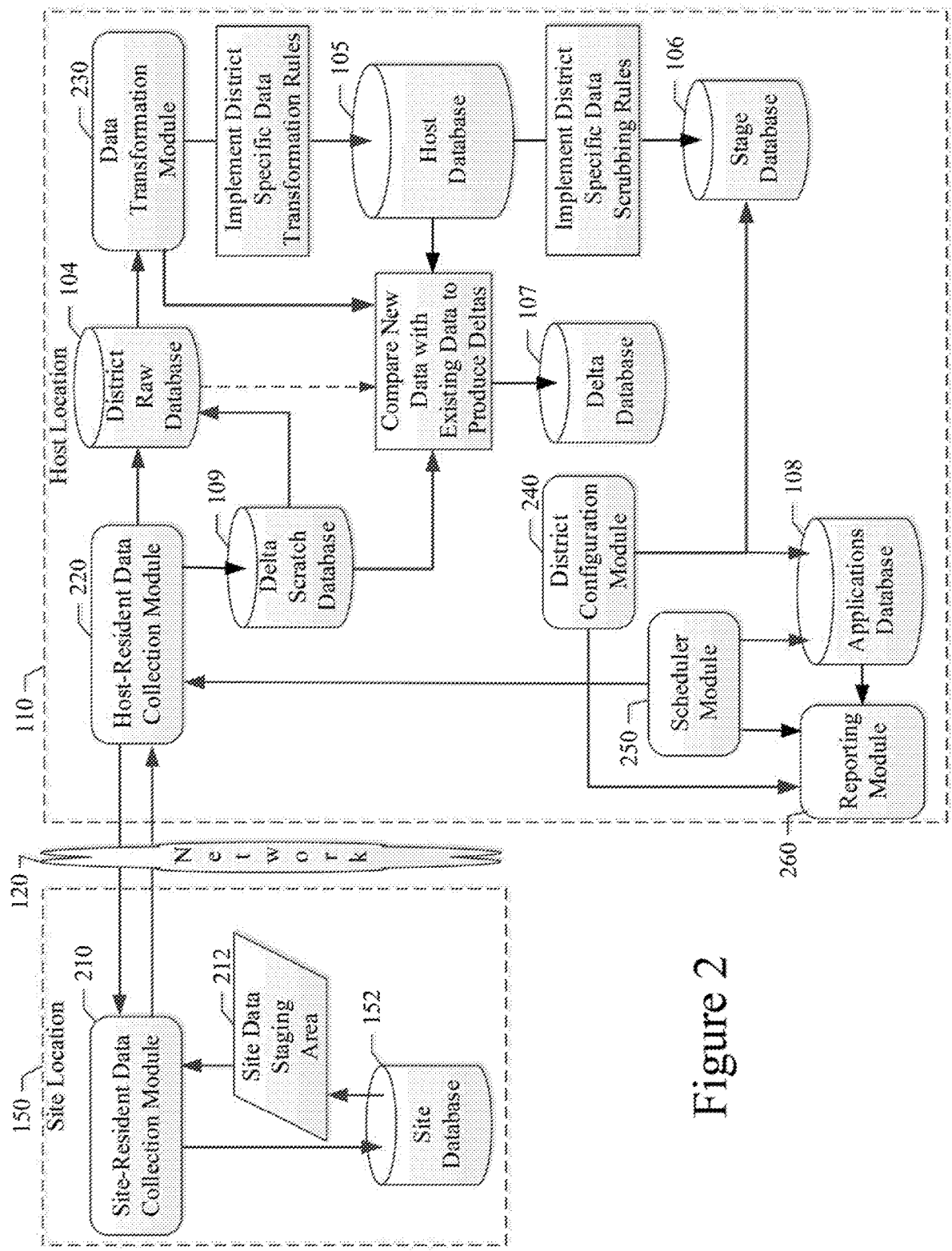
FIG. 2 illustrates an example embodiment of the student attendance management system including a site-resident data collection module configured to execute within an executable environment of a site location.

Referring again to FIG. 1, host site 110 of an example embodiment is shown to include student attendance management system 200. Student attendance management system 200 can include a site-resident data collection module 210, a host-resident data collection module 220, a data transformation module 230, a district configuration module 240, a scheduler module 250, a reporting module 260, a user account management module 270, and an administrative management module 280. Each of these modules can be implemented as software components executing within an executable environment of student attendance management system 200 operating on host site 110 or user platform 140. As shown in FIGS. 1 and 2, the site-resident data collection module 210 of an example embodiment can be configured to execute within an executable environment of site location 150. Each of these modules of an example embodiment is described in more detail below in connection with the figures provided herein.

Referring to FIGS. 1 and 2, the student attendance management system 200 of an example embodiment can include a site-resident data collection module 210. As described above, the site-resident data collection module 210 of an example embodiment can be configured to execute within an executable environment of site location 150. The site-resident data collection module 210 is configured to interface with a legacy system running at a particular district site or school location 150. The site-specific legacy system performs the standard collection and processing of student information and attendance data for the specific site and stores the data in a site database 152. Because the site-specific data stored in the site database 152 can be in an arbitrary format, incomplete, or inaccurate, the site-resident data collection module 210 is used to extract, collect, and marshal the site-specific data for transfer to the host-resident data collection module 220. In an example embodiment, the site-resident data collection module 210 can be a downloaded or otherwise installed executable that runs on the legacy system at a particular district site or school location 150. The site-resident data collection module 210 can also be a pre-installed executable, a dynamically installed plug-in, a mobile application (app), or a dynamically linked element that runs on the legacy system at a particular district site or school location 150. The site-resident data collection module 210 can be configured to check and verify that needed processing and memory space is available on the site's legacy system. Once the site-resident data collection module 210 is up and running on the site system, the site-resident data collection module 210 can access the site database 152 and validate and review the data structures and schema being used in the site database 152. In this manner, the site-resident data collection module 210 can dynamically determine the database record structures and record attributes being used for the particular site. Once the site database 152 structure is determined, the site-resident data collection module 210 can run a test data request with a configurable XML extraction document. The test data request can be configured by an administrator at the site or at the host location. The test data request is used to confirm that the site database 152 structure has been properly determined by the site-resident data collection module 210. At the conclusion of this test, the site-resident data collection module 210 is ready to begin transferring site-specific data to the host location 110.

Referring again to FIGS. 1 and 2, the student attendance management system 200 of an example embodiment can include a host-resident data collection module 220. The host-resident data collection module 220 cooperates with the site-resident data collection module 210 to periodically transfer site-specific data to the host location 110. The host-resident data collection module 220 and the site-resident data collection module 210 can be configured to wake up at pre-determined times to transfer any data updates that may have occurred since the prior data transfer. In this manner, the host location 110 and the host-resident data collection module 220 therein can receive timely updates of student and attendance information being changed at a particular site. These updates can occur with little, if any, involvement by site-specific resources.

The site-resident data collection module 210 can be configured to interface with and collect data from a wide variety of different site-specific legacy systems. Such legacy systems can be hosted, non-hosted, distributed, internal systems, and/or the like. The site-resident data collection module 210 can collect the data in a site data staging area 212, where the data is encrypted, zipped, and delivered to the host-resident data collection module 220 via a secure network 120 connection (e.g., HTTPS). In one embodiment, the data can be delivered to the host-resident data collection module 220 via an encrypted data file.

The site-resident data collection module 210 can be configured to receive a request from the host-resident data collection module 220 for an immediate data update. In this way, the host-resident data collection module 220 can trigger an ad hoc data update from the site location 150 at a time of the host location's 110 choosing. Thus, as described above, the site-resident data collection module 210 and the host-resident data collection module 220 can operate collaboratively to effect the transfer of raw site-specific data from the site location 150 and the site database 152 therein to the host location 110. This raw site-specific data (denoted herein as raw district data) can be transferred to a district raw database 104 and a delta scratch database 109 at host location 110 by the host-resident data collection module 220. In the example embodiment, the raw district data can be decompressed, decrypted, and stored in district raw database 104 and made available to the other processing modules of host location 110. The data in the delta scratch database 109 can be used in the process to identify changes in the received data. At each data collection interval, each new set of raw district data can replace and overwrite a prior set of raw district data stored in district raw database 104 and delta scratch database 109.

Referring again to FIGS. 1 and 2, the student attendance management system 200 of an example embodiment can include a data transformation module 230. The data transformation module 230 has access to the raw district data stored in district raw database 104. The raw district data can comprise student information, attendance data, school or district information, and other information specific to site location 150. Because this raw district data can be in an arbitrary format, incomplete, or inaccurate, the data transformation module 230 is used to normalize and otherwise transform the raw district data into a consistent form. The data transformation module 230 can be configured to use customized rules and processes to aggregate the raw district data into a common format. Because each school district can uniquely set up and store their data, this normalization and data transformation process is specific for each district or school. The normalized data is then uploaded into host databases, such as host database 105.

In an example embodiment, the data transformation module 230 can compare a newly received set of data stored in district raw database 104 and delta scratch database 109 against a corresponding set of data previously received from the same site location 150 and stored in database 105. This comparison can result in a set of differences or deltas (e.g., a configurable delta row key map) that define the data elements that have changed from a previous data update. These deltas can be stored in a delta database 107. Additionally, the data transformation module 230 can also aggregate the set of raw district data stored in district raw database 104 and implement district-specific data transformation rules to normalize the data and store the processed district data into the host database 105. In an example embodiment, these district-specific data transformation rules can be implemented as configurable join rules. The district-specific data transformation rules in an example embodiment are described in more detail below.

In an example embodiment, the data transformation module 230 can implement district-specific data transformation rules to validate and normalize the raw district data received from a site location 150. For example, the data transformation module 230 can implement rules to test the data for particular conditions known to require intervention by remedial software or host administrative personnel. These validation tests can include the following:

Do both Student and Attendance tables contain all the site codes expected? If not, troubleshoot with Software Engineer, Implementation Coordinator, and district Information Technologists (IT) as needed.

Are there any configuration codes present that were not accounted for in the configuration files received previously? If so, inform Implementation Coordinator.

Has attendance data for all sites been received as expected? If not, troubleshoot with Software Engineer, Implementation Coordinator, and district IT as needed.

Examine Period Frequency table and determine if any Validation rules will need to be created, such as moving attendance data from one of the periods to the AllDay-Code field for the Elementary sites (most common example).

Review the raw district data received from a site location 150 for particular values that may be indicative of validation issues. Validation of these particular values can include the following:

Missing Sites—This means data for one or more sites that is expected was not received.

Non-Configured Codes—This means some type of code (e.g., language, ethnicity, grade, attendance, etc.) is showing up in the data and is not defined. Attendance & Language codes could affect letter production.

Attendance on Holidays and Weekends—This means the received raw data is showing attendance on a date that is configured in the Scheduler as a district non-school day. This is rarely anything other than accidental pre-filled attendance.

Total Attendance Record count—This should show a steady pattern of attendance up through the data the data was pulled for all active sites.

Active Student Count by Site—This should show relatively similar student counts per site type.

Ethnicity—The ethnic breakdown should be as expected (e.g., are there missing ethnicities).

Attendance Outside School Year—There should be no attendance showing up outside of the school year Student Entry Dates>School Year End Date—There should be none or very few students (pre-enrolls) with entry dates after the end of the current school year.

Upload Summary—Any upload errors will need to be investigated in a Batch Services process.

Attendance at Non-Participating Sites—There should not be any attendance showing up for non-participating sites.

Letter Count—Most sites should produce letters. Any sites that don't produce letters should be investigated to be sure their configuration is correct and none of their students should be triggering any letters yet.

Exit date before entry date

Valid email addresses

Valid Names

As the data transformation module 230 implements the district-specific data transformation rules, such as those described above, sites that send raw district data with validation errors can be flagged. At a designated time, the flagged sites can be sent alerts notifying them of the data discrepancies.

The particular validation and normalization rules used by the data transformation module 230 can be configured and/or modified using a particular user interface provided by the district configuration module 240. The district configuration module 240 is described in more detail below. Once the data transformation module 230 validates and normalizes the raw district data, the normalized site data can be uploaded into host database 105. The data transformation module 230 can further implement data scrubbing rules to filter out site data not needed for letter generation, site reporting, or otherwise not needed by the host application. The site data needed for letter generation, site reporting, or otherwise used by the host application can be transferred to the stage database 106. Only site data for active sites is moved to the stage database 106. An additional level of data scrubbing can be performed on the site data in the stage database 106. The resulting data can be transferred to the applications database 108. As described in more detail below, the validated, normalized, filtered, and scrubbed site data in the applications database 108 can be used by the district configuration module 240, the scheduler module 250, and the reporting module 260 to generate appropriate attendance letters and notifications to students, site administrative personnel, and third-party administrators as needed.

Referring again to FIGS. 1 and 2, the student attendance management system 200 of an example embodiment can include a district configuration module 240. In a particular embodiment, specific rules and alerts can be set up within the student attendance management system to identify trends, events, and instances when a student, a school, or a district should be notified of an identified situation. These notifications are the drivers for improving school attendance. The specific rules and alerts, and associated codes and triggers, can be pre-defined within the student attendance management system application. These rules and alerts can be customized to address specific school district needs if requested.

The district configuration module 240 can be used to specify and manage the particular rules and processes used to generate and distribute alerts, such as attendance letters and notifications. For example, the manner of distribution of an attendance letter or notification (e.g., physical letter, email, or the like) can be pre-defined in a configurable way. Additionally, whether a letter or notification is generated at all for a particular student, site administrator, or third party administrator can also be configured. Finally, the content of a letter or notification can be customized for a particular recipient based on a variety of factors that can be encoded into a plurality of codes the district configuration module 240 can make configurable and customizable. In an example embodiment, these codes, triggers, and related data can include the following:

Ethnicity codes
Language codes
Site codes
Attendance codes—configurable attendance codes that trigger specific letter types
Grade codes
Status codes (active/inactive)
Attendance triggers
    Attendance follows student from previous site within a district (Follow Me)
    Send letters to multiple guardians
    Send conference notifications
    Exclude sending letters to students under N years of age
    Exclude absences that occurred before the student turned N years old.
    Exclude sending letters to students over the age of N
    Attendance tracking (all day vs. period attendance)
    Suppressing letters options
    Set number of 'NEW' absences that triggers the next letter.
Letter codes
    Letter types
    Pre-requisite
    Attendance threshold
    Printing of letter
    Emailing of letter
    Generate a conference
    Letter Templates
    Merge Fields
        Logo
        Conference logo
        Return address
        Number of absences in District Policy
    Letter Contacts—merge field on printed letter
        Signers
        Contacts The district configuration module 240 provides the ability within the same district school site to set different attendance triggers, letters, and contacts based on grade. For example, grades K-5 can have an attendance trigger based on the all-day attendance code and grades 6-8 have an attendance trigger based on attendance in periods 1-6.

The district configuration module 240 of an example embodiment also provides the ability to configure a letter code to trigger an attendance letter if an event occurs within a designated timeframe, such as a number of days (e.g., school days), weeks (e.g., calendar weeks) or months (e.g., calendar weeks). For example, a code can be configured to trigger an attendance letter on three unexcused absences within a four week period. The district configuration module 240 provides the flexibility to choose when to send subsequent attendance letters. For example, a subsequent attendance letter can be printed only if a pre-requisite letter was printed or a closed conference was completed. For example, a code can be defined to enable a second letter to be printed prior to the first letter being printed, or a code can be defined to disable the printing of a second letter prior to the printing of the first letter. Thus, in a similar manner, a variety of codes, triggers, and rules can be created and managed using the district configuration module 240 of an example embodiment.

Referring again to FIGS. 1 and 2, the student attendance management system 200 of an example embodiment can include a scheduler module 250. Once the normalized school student information is resident in the host database (e.g., applications database 108), the scheduler module 250 and the reporting module 260 of an example embodiment can be used to generate attendance letters, notifications, and other alerts according to a defined schedule and to schedule conferences based on prescribed rules configured using the district configuration module 240. In some cases, some notifications can be suppressed or delayed to implement a pre-defined policy. In most cases, the notifications are sent on regular intervals to ensure consistency.

The scheduler module 250 of an example embodiment can be used to define and manage a schedule for the generation and distribution of alerts, including attendance letters and notifications. In a particular embodiment, the scheduler module 250 can be configured to schedule around U.S. holidays, district events, or host location non-operational days. Additionally, the scheduler module 250 can be configured to schedule in production delays, personnel review/processing delays, data processing delays, mailing delays, and other foreseeable delay scenarios that may affect the production of alerts.

In an example embodiment, the scheduler module 250 can be configured to view a district's schedule for previous fiscal years. A user of the scheduler module 250 can add, delete, and/or edit an attendance letter or notification production schedule. In addition, the scheduler module 250 can impose some limitations on the user's configuration of a production schedule. For example, in a particular embodiment, the following restrictions can be imposed on the user:
    When editing a production schedule, a user cannot select a date for a production event if the date falls on a weekend, a US holiday, an important district date, or an important date for the host location.

Cannot schedule a production run with the same attendance data as a previous run through, data processing, client review, or print date.

Users cannot delete a past run without the role 'Can delete past tasks in Scheduler'.

Users with the role 'Can delete past tasks in Scheduler' cannot delete past runs where letters are associated to the run.

Users cannot schedule same day tasks without the role 'Can Schedule same day tasks in Scheduler'.

User has the ability to delete a whole production run (only future production runs unless the user has the role to delete past runs).

Cannot have a production run when the data processing date is less than the previous run's print date.

Cannot have a production run when the Client Review date is before the previous run's print date.

Cannot have a production run when the Attendance Through date is before the previous run's attendance through date.

Thus, using a variety of features and automatically imposed restrictions provided by the scheduler module 250, a user can configure, schedule, and manage production runs for producing alerts or scheduling conferences in an example embodiment. The scheduler module 250 can also be configured to perform several suppression functions. Suppression functions are used by a host administrator to temporarily or permanently prevent the generation and distribution of attendance letters, notifications, or other alerts to particular students, particular schools, particular districts, or other groups or locations. In a particular embodiment, several letter suppression types are supported: 1) One-Time: only suppresses the letter for the current production run, 2) Extended: suppresses a letter for a configured number of additional absences, or 3) Indefinite: suppress a letter for the remainder of the current school year. In addition, the example embodiment can suppress a letter from being generated for a particular student for the current school year.

Referring again to FIGS. 1 and 2, the student attendance management system 200 of an example embodiment can include a reporting module 260. In an example embodiment, the reporting module 260 can be configured to associate a unique student identifier with every student in the host databases 103. This student identifier is unique for a particular student across all districts, schools, and locations serviced by the host system 110. As a result, the student attendance management system 200 can track and report on the same student year over year within the same district, within different districts, and across different States as students move to different locations. This feature of an example embodiment enables better tracking of students over time, even if students change locations, addresses, or names.

The reporting module 260 is used to generate reports, attendance letters, notifications, other alerts, or schedule conferences according to the schedule configured using the scheduler module 250. In an example embodiment, the reporting module 260 can access the data in the applications database 108, or other host databases 103, to generate reports that highlight trends in student attendance for a variety of comparative factors, including: trends for particular students or student groups, trends qualified by student demographic factors, trends qualified by time periods, trends qualified by historical data vs. current data, trends by location, district, school, or State, trends qualified by funding levels, and a variety of other reports generated from the attendance and student data maintained in the host databases 103. As a result, the student attendance management system 200, and the reporting module 260 in particular, can produce a wealth of attendance information aggregated across wide variations in time and location. For example, a particular embodiment can generate a Save Rate report that highlights the percentage of students that do not continue on a path toward chronic absenteeism after an A2A intervention. The Save Rate report can measure the change in behavior of at-risk students as they are exposed to the benefits of the A2A processes, such as attendance letters and scheduled conferences. In another report, the reporting module 260 can generate a comparative analysis that compares a district's performance in managing student attendance against other districts or regions managed by the student attendance management system 200. In particular, the comparative analysis report can compare a district's performance against a State average of: truancy (unexcused absences), excessive excused absences, and chronic absenteeism.

In an example embodiment, the reporting module 260 can include a user interface for configuring and enhancing the reporting operation. In a particular embodiment, the user interface of the reporting module 260 can be used to add notes to attendance letters, notifications, or other alerts. For example, letter notes can be associated with a specific letter for a student, student notes can be associated with a specific student, and conference notes can be associated with a specific conference for a student. In addition, the user interface of the reporting module 260 can be used to add, edit, or delete guardian information associated with a particular student. The user interface of the reporting module 260 can also be used to configure the manner in which notifications are sent (e.g., by letter, email, or text message).

In a particular embodiment, the user interface of the reporting module 260 in concert with the scheduler module 250 can be used to generate and schedule a conference for particular individuals as part of the A2A attendance management process. For example, an attendance letter, notification, or other alert can be configured to automatically queue a student for conference scheduling when the letter, notification, or other alert is printed. The user interface of the reporting module 260 in concert with the scheduler module 250 can be used to schedule individual conferences or group conferences (e.g., more than one student in a conference). The user interface can also be used to add and edit a conference schedule item, specify a date, time, and location, and configure the reporting module 260 to send a conference notification to a student, parent or guardian, or school/district administrator. The user interface of the reporting module 260 in concert with the scheduler module 250 can also be used to update the status of a scheduled conference, reschedule a conference, or cancel/close a scheduled conference. Upon closing a conference, the user can also add a reason or a note related to the closure of the conference.

Figure 3:
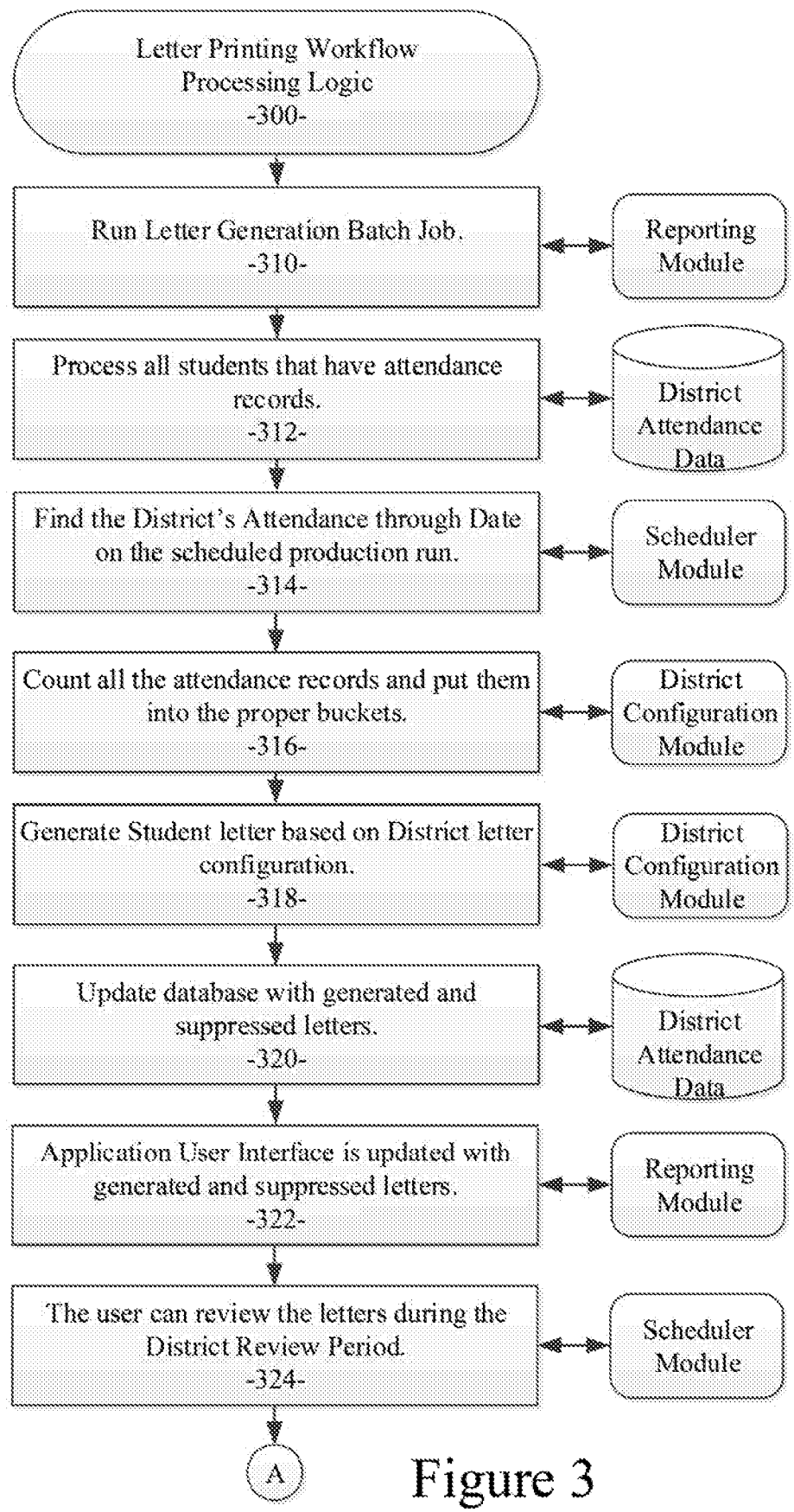
FIGS. 3 and 4 are flow diagrams illustrating the letter printing workflow in an example embodiment.
Figure 4:
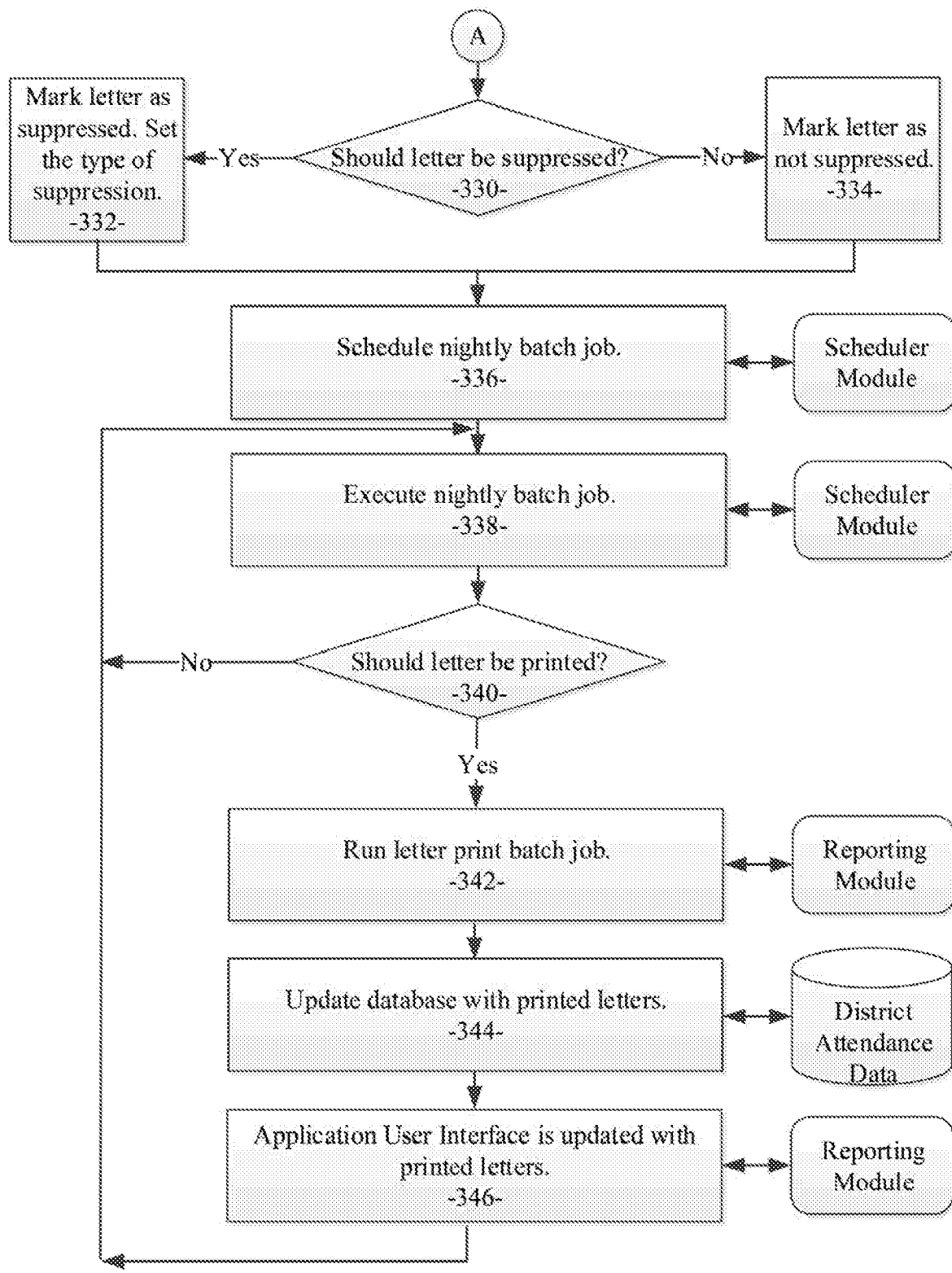

Referring now to FIGS. 3 and 4, a flow diagram illustrates the letter printing workflow in an example embodiment. As described above, the reporting module 260 in concert with the scheduler module 250 and attendance and student data stored in host databases 103 can be used to generate attendance letters, notifications, and other alerts, which can be distributed to students, parents or guardians, and school or district representatives. The letter generation process can be performed in real time or as a batch job run on off-peak hours.

Referring now to FIG. 3, processing starts for the letter printing workflow of an example embodiment. At processing block 310, the workflow process runs a letter generation batch job. The batch job processes all students that have attendance records (processing block 312). The process finds the district's attendance through date on the scheduled production run (processing block 314). All the attendance records are counted and classified into the proper buckets (processing block 316). Student letters are generated based on the district letter configuration (processing block 318). The host database is updated with the generated and suppressed letters (processing block 320). The application user interface is updated with generated and suppressed letters (processing block 322). The user can review the generated letters during a district review period (processing block 324).

Referring now to FIG. 4, processing continues at bubble A for the letter printing workflow of an example embodiment. At decision block 330, a query is processed. Should the letter be suppressed? (decision block 330). If yes, the letter is marked as suppressed. The type of suppression can be set by the user (processing block 332). If no, the letter is marked as not suppressed (processing block 334). Then, the nightly letter processing batch job is scheduled (processing block 336). The nightly letter processing batch job is executed (processing block 338). Should the letter be printed? (decision block 340). If yes, the letter print batch job is run (processing block 342). The host databases is updated with the printed letters (processing block 344). The application user interface is updated with the printed letters (processing block 346). Processing then terminates for the letter printing workflow of an example embodiment.

Figure 5:
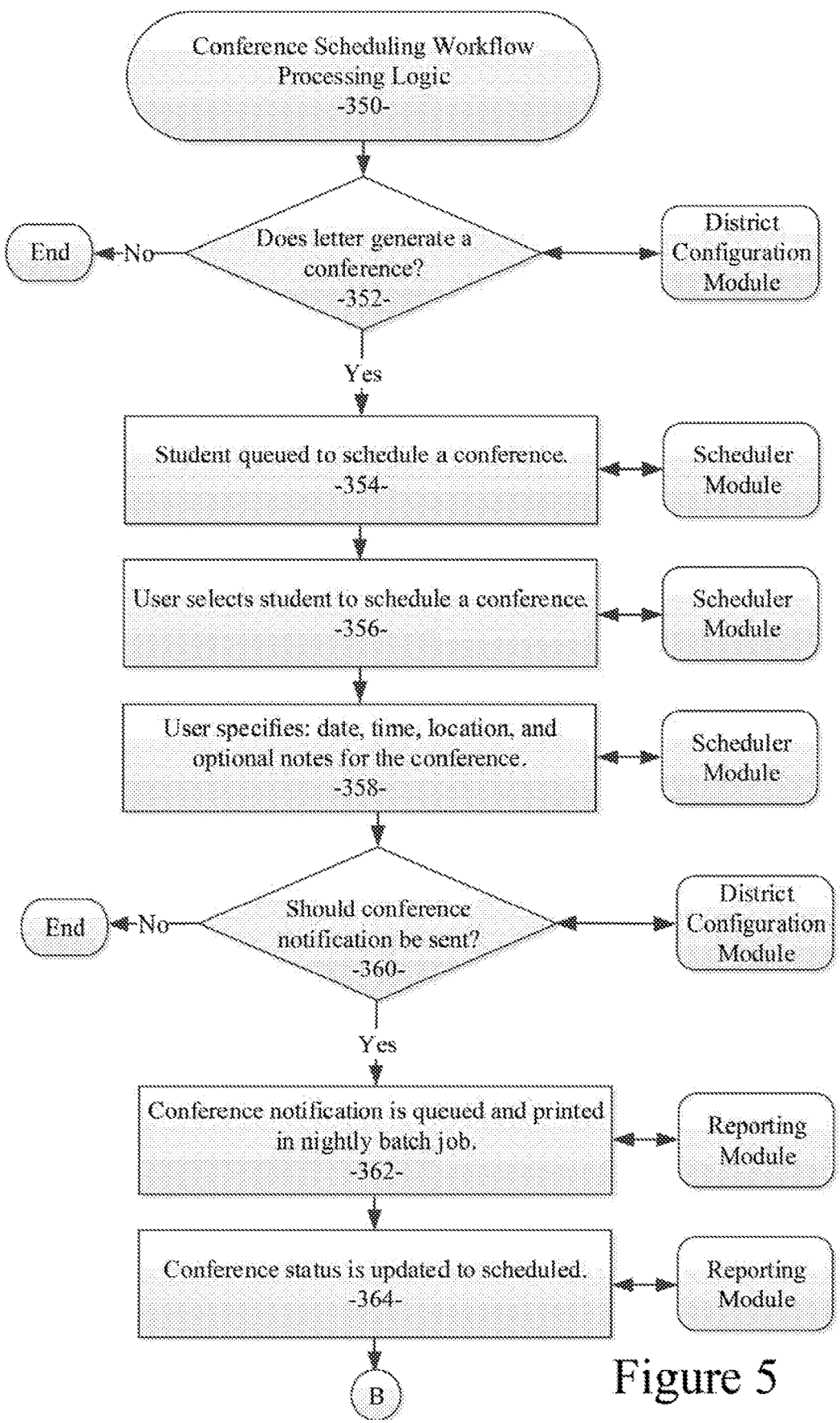
FIGS. 5 and 6 are flow diagrams illustrating the conference scheduling workflow in an example embodiment.
Figure 6:
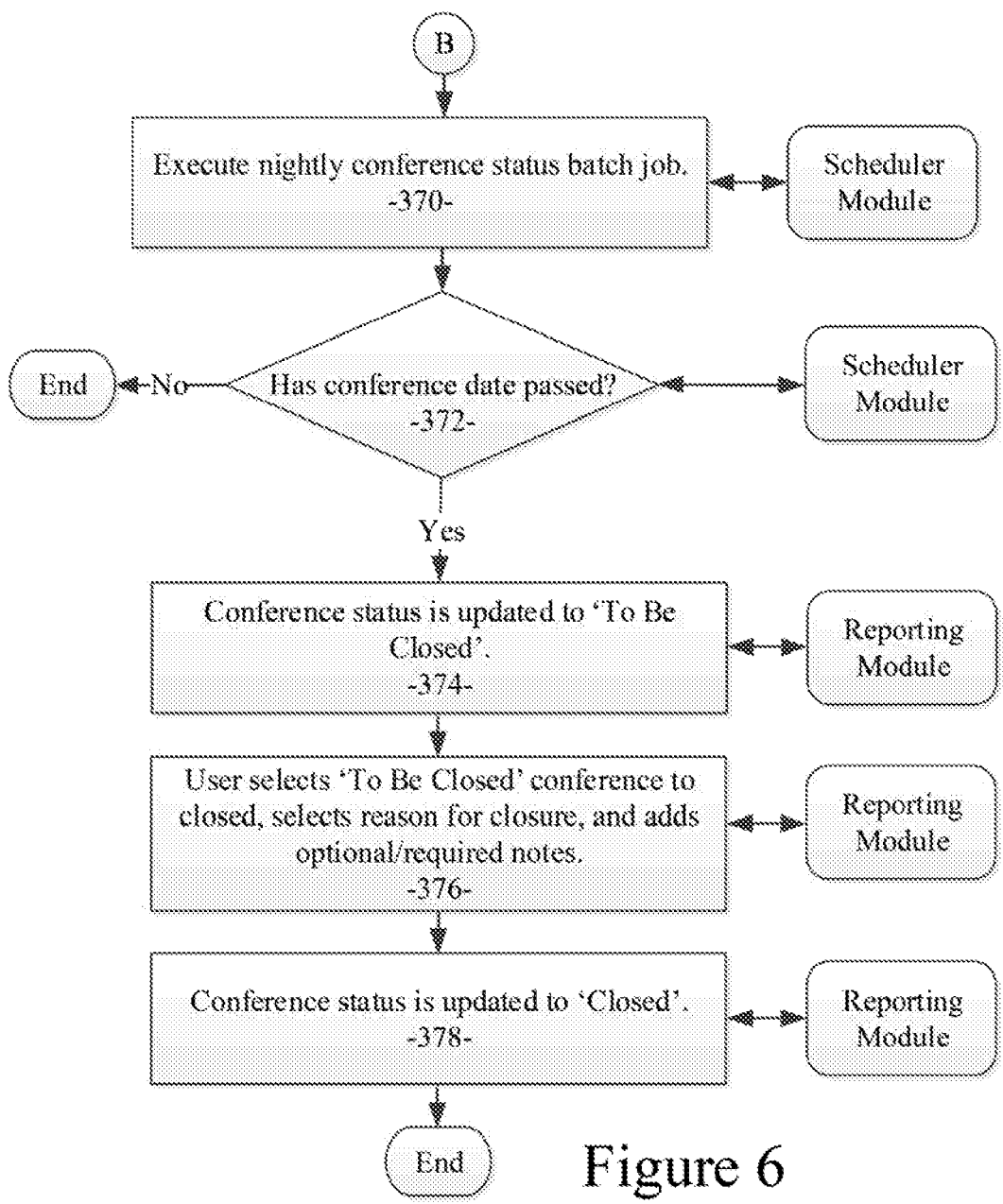

Referring now to FIGS. 5 and 6, a flow diagram illustrates the conference scheduling workflow in an example embodiment. Referring to FIG. 5, processing starts for a conference scheduling workflow of an example embodiment. At decision block 352, a query is processed. Does the letter generate a conference? If yes, the student corresponding to the letter is queued to schedule a conference (processing block 354). The user can select a particular student for whom a conference is scheduled (processing block 356). The user can specify: date, time, location, and optional notes for the conference (processing block 358). Should a conference notification be sent? (decision block 360). If yes, a conference notification is queued and printed in a nightly batch job (processing block 362). The conference status is updated to scheduled (processing block 364).

Referring to FIG. 6, processing continues at bubble B for the conference scheduling workflow of an example embodiment. At processing block 370, the workflow executes a nightly conference status batch job. Has the conference date passed? (decision block 372). If yes, the conference status is updated to 'To Be Closed' (processing block 374). The user can select 'To Be Closed' to close the conference to be closed. The user can also select a reason for the closure, and can add optional/required notes (processing block 376). The conference status is updated to 'Closed' (processing block 378). Processing terminates for the conference scheduling workflow of an example embodiment.

As described above, a user platform 141 can include a mobile device on which a mobile application (app) can be executed. An example embodiment 400, implemented as a mobile device app, can be used to support a mobile device user interface for the student attendance management system 200 of an example embodiment. It will be apparent to those of ordinary skill in the art that other embodiments can also be implemented as a web application (app) with one or more webpages or other types of user interfaces. A mobile version of an example embodiment provides a user-friendly interface from which the user can easily view the relevant school information from a mobile device. As described in more detail below, a mobile software application (app) embodying a mobile version of an example embodiment as described herein can be installed and executed on a mobile device, such as a smart phone, laptop computer, tablet device, or the like. In an example embodiment, a splash screen appears whenever the user opens or launches the mobile application on the mobile device. This splash screen displays a host logo and wallpaper image while opening the login screen or a live feed of processed school information.

User log-in functionality in the mobile app provides a user-friendly user interface in which the user provides the email address and password associated with the user account. If the user does not have an account, the user can create an account from this user interface. The process of creating a user account in an example embodiment is simple and only requires the user to provide the following information: name, surname, e-mail address, and password. By completing this information, the user can create an account and get access to processed school information.

Referring again to FIG. 1, the student attendance management system 200 of an example embodiment is also shown to include a user account management module 270. The user account management module 270 can be used to create and maintain a user account on the host site 110. The user account management module 270 can also be used to configure user settings, create and maintain a user/user profile on host site 110, and otherwise manage user data and operational parameters on host site 110. In the example embodiment described herein, a user can register as an identified user in order to share information, documents, communications, or other content. The registered user can enter their name, email address, and password. Once this information is entered, a user account is created and the user can share information, documents, communications, or other content.

Referring again to FIG. 1, the student attendance management system 200 of an example embodiment is shown to include an administrative management module 280. The administrative management module 280 can be used by an agent of the student attendance management system 200 to manage user accounts and to manage the student attendance management system. The administrative management module 280 can also be used to enforce privacy protections and content controls for users. Moreover, the administrative management module 280 can also be used to generate and/or process a variety of analytics associated with the operation of the student attendance management system 200. For example, the administrative management module 260 can generate various statistical models that represent the activity of the community of users and related districts, schools, students, and the like. These analytics can be shared, licensed, or sold to others.

Although the various user interface displays provided by the example embodiments described herein are nearly infinitely varied, several sample user interface displays and sequences are provided herein and in the corresponding figures to describe various features of the disclosed embodiments. These sample user interface displays and sequences are described herein and in the accompanying figures. It will be apparent to those of ordinary skill in the art that equivalent user interface displays and sequences can be implemented within the scope of the inventive subject matter disclosed and claimed herein.

Figure 7:
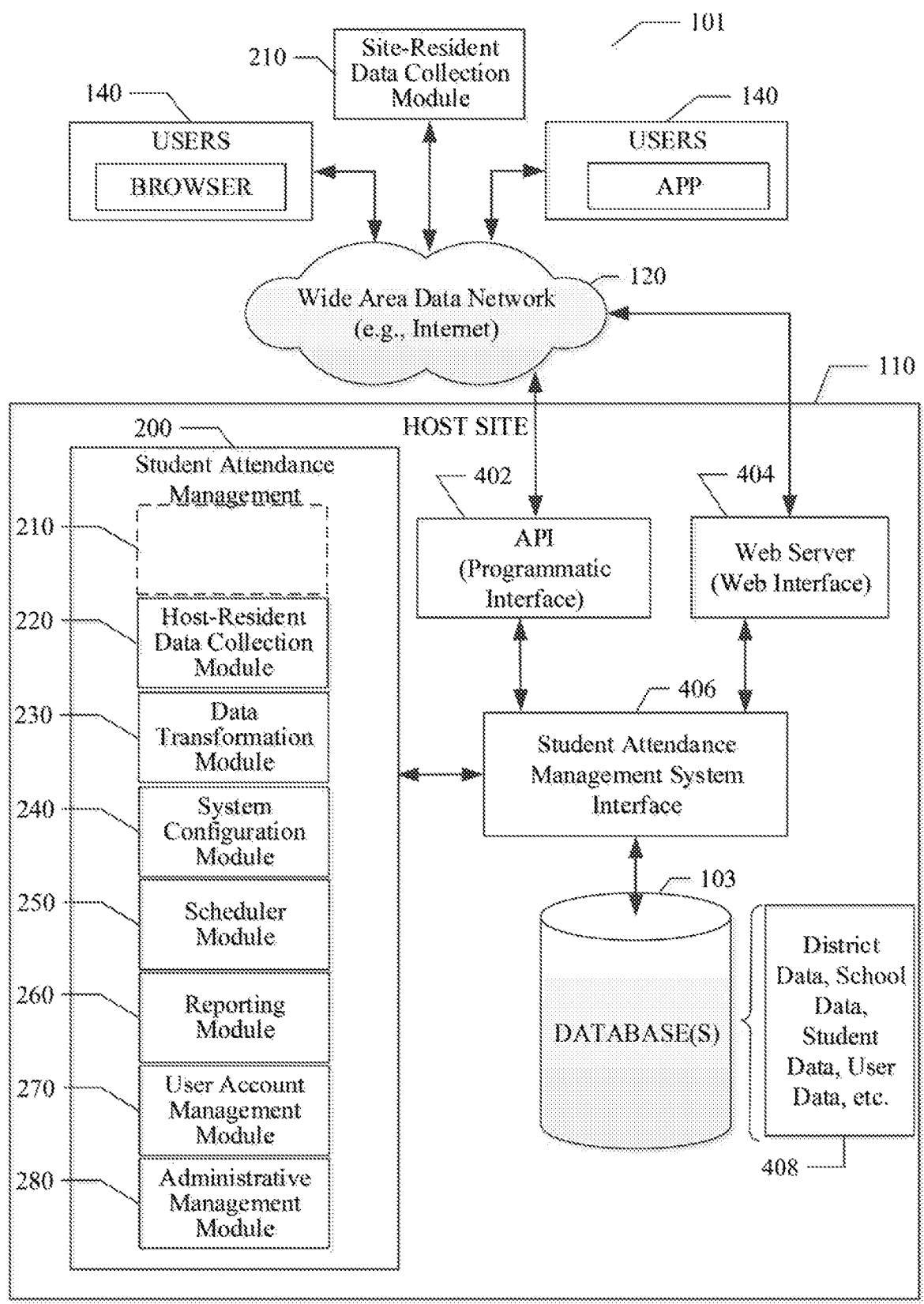
FIG. 7 illustrates another example embodiment of a networked system in which various embodiments may operate.

Referring now to FIG. 7, another example embodiment 101 of a networked system in which various embodiments may operate is illustrated. In the embodiment illustrated, the host site 110 is shown to include the student attendance management system 200. The student attendance management system 200 is shown to include the functional components 210 through 280, as described above. In a particular embodiment, the host site 110 may also include a web server 404, having a web interface with which users may interact with the host site 110 via a user interface or web interface. The host site 110 may also include an application programming interface (API) 402 with which the host site 110 may interact with other network entities on a programmatic or automated data transfer level. The API 402 and web interface 404 may be configured to interact with the student attendance management system 200 either directly or via an interface 406. The student attendance management system 200 may be configured to access a data storage device 103 and data 408 therein either directly or via the interface 406.

Figure 8:
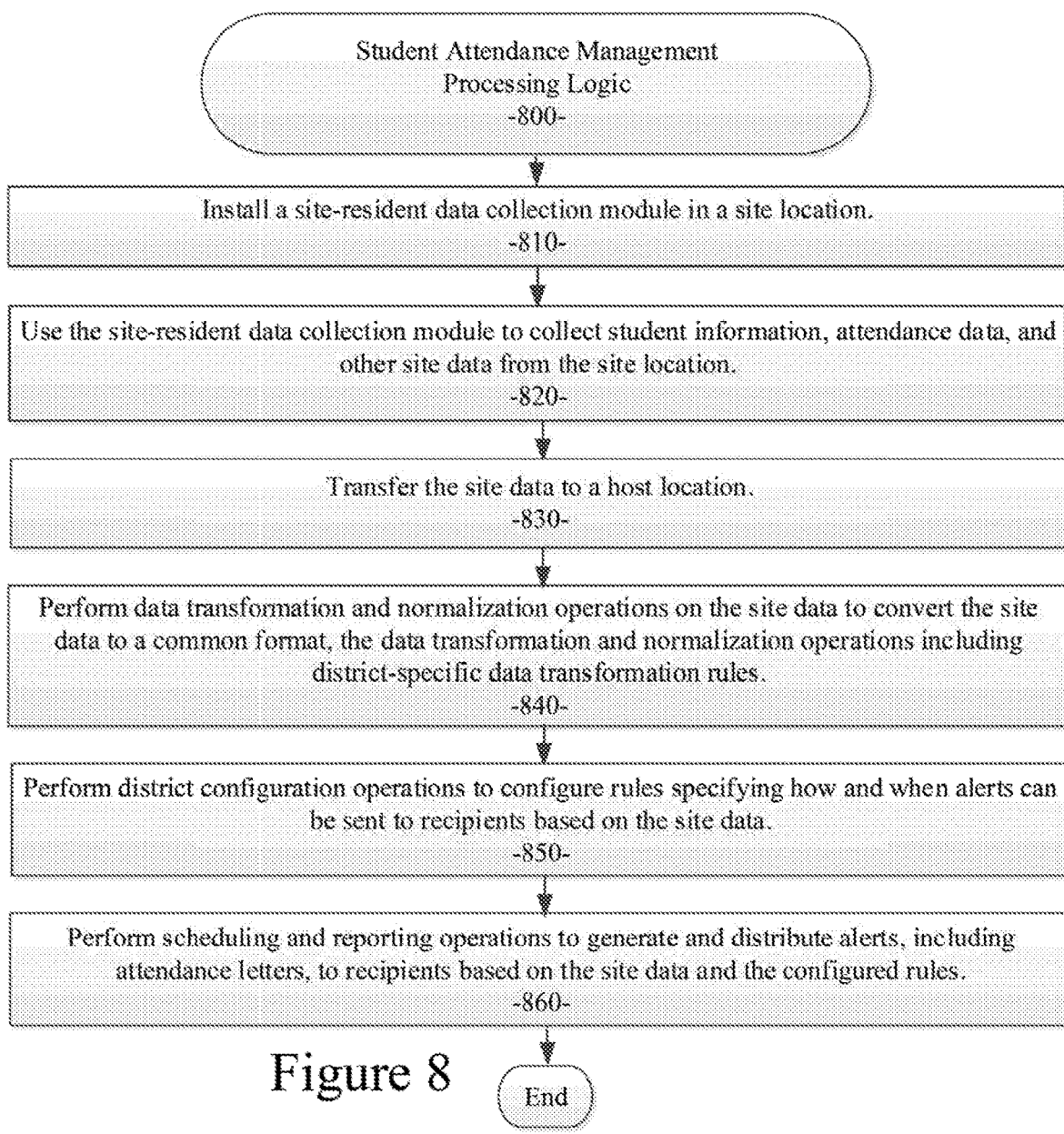
FIG. 8 is a processing flow chart illustrating an example embodiment of a method as described herein.

Referring now to FIG. 8, a processing flow diagram illustrates an example embodiment of a student attendance management system 200 as described herein. The method 800 of an example embodiment includes: installing a site-resident data collection module in a site location (processing block 810); using the site-resident data collection module to collect student information, attendance data, and other site data from the site location (processing block 820); transferring the site data to a host location (processing block 830); performing data transformation and normalization operations on the site data to convert the site data to a common format, the data transformation and normalization operations including district-specific data transformation rules (processing block 840); performing district configuration operations to configure rules specifying how and when alerts can be sent to recipients based on the site data (processing block 850); and performing scheduling and reporting operations to generate and distribute alerts, including attendance letters, to recipients based on the site data and the configured rules (processing block 860).

Figure 9:
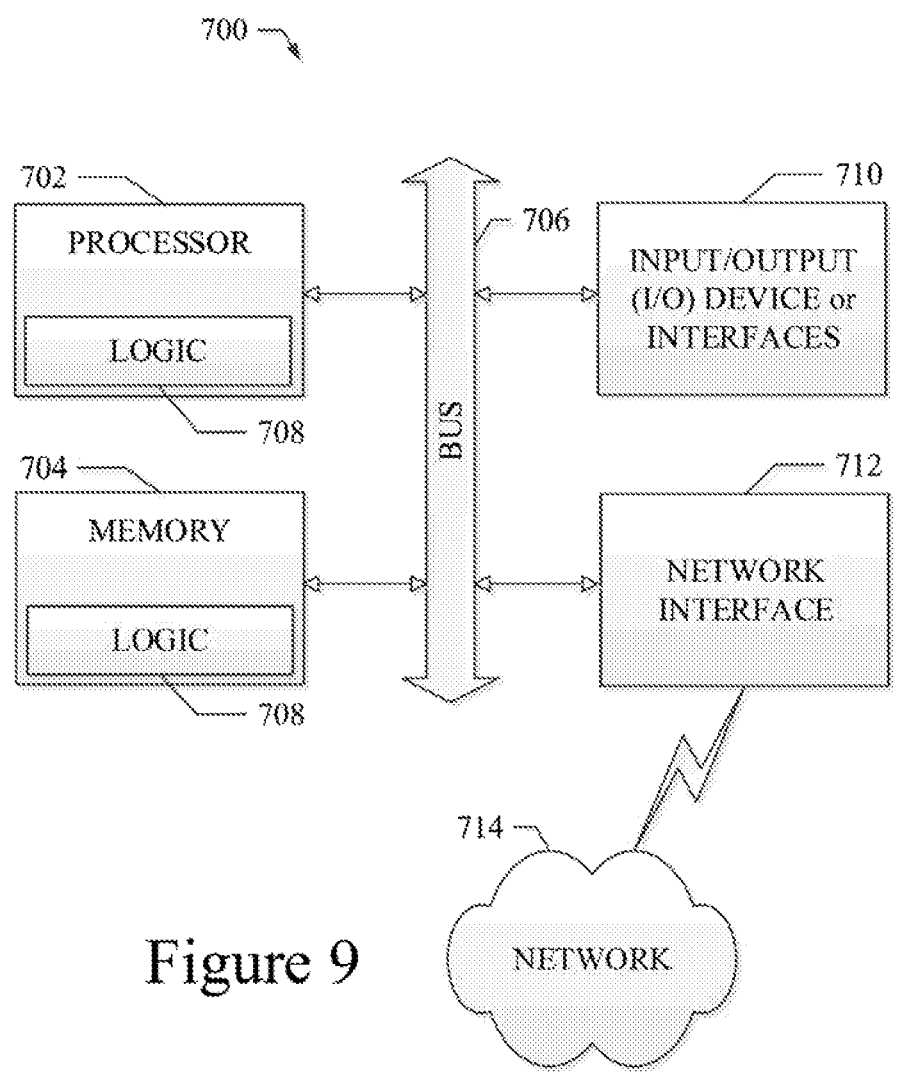
FIG. 9 shows a diagrammatic representation of machine in the example form of a computer system within which a set of instructions when executed may cause the machine to perform any one or more of the methodologies discussed herein.

FIG. 9 shows a diagrammatic representation of a machine in the example form of a stationary or mobile computing and/or communication system 700 within which a set of instructions when executed and/or processing logic when activated may cause the machine to perform any one or more of the methodologies described and/or claimed herein. In alternative embodiments, the machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example stationary or mobile computing and/or communication system 700 includes a data processor 702 (e.g., a System-on-a-Chip (SoC), general processing core, graphics core, and optionally other processing logic) and a memory 704, which can communicate with each other via a bus or other data transfer system 706. The stationary or mobile computing and/or communication system 700 may further include various input/output (I/O) devices and/or interfaces 710, such as a monitor, touchscreen display, keyboard or keypad, cursor control device, voice interface, and optionally a network interface 712. In an example embodiment, the network interface 712 can include one or more network interface devices or radio transceivers configured for compatibility with any one or more standard wired network data communication protocols, wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth, IEEE 802.11x, and the like. In essence, network interface 712 may include or support virtually any wired and/or wireless communication mechanisms by which information may travel between the stationary or mobile computing and/or communication system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the stationary or mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

Conferencing

Figure 10:
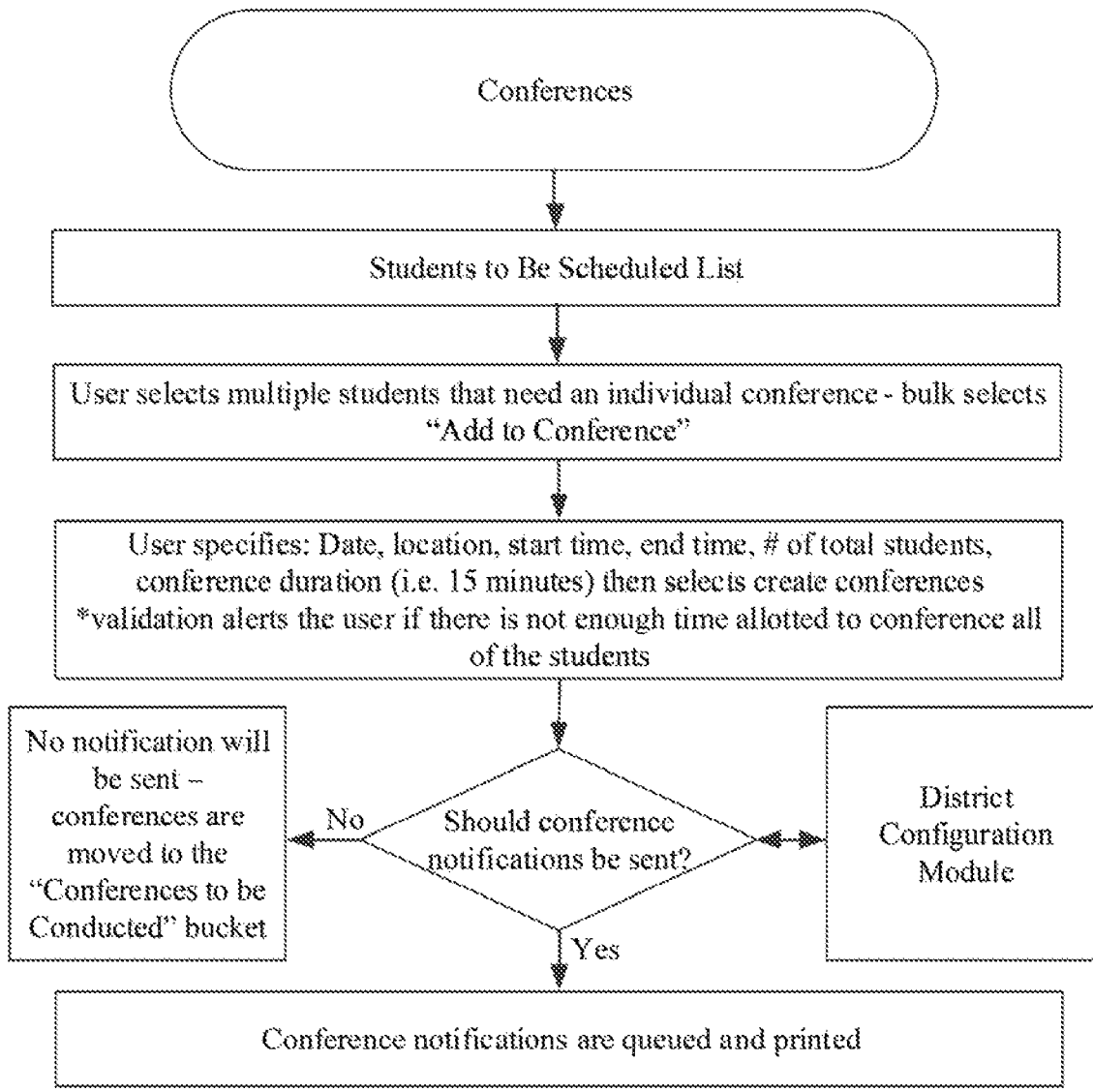
FIG. 10 is an operational or processing flow chart illustrating an example embodiment of a method as described herein for block conferencing workflow.

Referring now to FIG. 10 in an example embodiment, the Block Conferencing features of the example embodiment are illustrated. FIG. 10 is an operational or processing flow chart illustrating an example embodiment of a method as described herein for block conferencing workflow. In the example embodiment, a block conferencing feature is provided to assist district users or other users in quickly scheduling multiple conferences with few clicks. As described above, the reporting module 260 can be used to generate reports, attendance letters, notifications, other alerts, or schedule conferences according to the schedule configured using the scheduler module 250. The scheduler module 250 can be used to generate and schedule a conference for particular individuals as part of the A2A attendance management process. In an example embodiment, the scheduler module 250 can also provide additional processing to schedule individual conferences in blocks to minimize the actions required via the user interface. In the example embodiment, the current workflow of scheduling individual or group conferences can be implemented as described above. Additionally, the block conferencing feature of an example embodiment is compatible with the student filters on the conferencing pages. As provided in an example embodiment, a variety of bulk or block actions can be applied to multiple entities (e.g., students, student groups, staff, etc.) for the purpose of scheduling a conference, modifying a scheduled conference, or canceling a scheduled conference. In the example embodiment, the block conferencing feature may not assist users in mass scheduling group conferences—only multiple individual conferences may be scheduled via the block conferencing feature. Selections made, such as Date/Location/Staff/Note Text, will apply to all conferences for the selected group.

Referring to FIG. 10, a user can navigate to a Conferences page and then navigate to either the 'Students To Be Scheduled' or a 'Students To Be Rescheduled' tab. The user can then apply filters, if needed, to refine the student list for the set of targeted students.

The user can select the students for whom conferences are to be scheduled by checking a box to the left of an 'Add to Conference' symbol, or select all students by checking a box to the left of an 'Actions' column. The user can select an 'Add to Conference' option from a drop down bulk action menu. A 'Select Conference' pop-up window will appear in response to the 'Add to Conference' user selection. The user can be prompted to click on a radio button 'Block Conference Scheduler' and to select 'Continue.'

Referring still to FIG. 10, a new screen will open to prompt the user to set the conference details. A list of students selected can be displayed in a list like when scheduling an individual or a group conference. By use of a user interface, the user can enter the conference details accordingly. For example, the user can specify among the following conference details:

Date: the user can enter the date on which to schedule the conferences. In response to this action, the date will show on all the student notification letters for the selected students;

Location: the user can enter the conference location. In response to this action, the location will show on all the student notification letters for the selected students;

Begin Time: the user can enter the time at which the conference will start on the date selected;

End Time: the user can enter the time at which the conference will end on the date selected;

Number of Students: the user can enter the number of students to be scheduled in the specified time slot. The value entered determines how many students will be scheduled in each time slot. The user can enter "1" to book one student in each time slot; enter "2" or more to book multiple students in one time slot. Entering a number equal to or greater than "2" will not schedule the students in group conferences. All conferences scheduled through this feature will be individual conferences even if they start at the same time; and Conference Duration: the user can enter the length (in minutes) of each conference. All conferences for the selected students must be the same length.

Once all conference details have been entered by the user, the user can select a "Create Conferences" option of the user interface. If any information is invalid, a warning will appear and the user will not be allowed to create the conferences until the invalid information is corrected. For example, entering an end time that is prior to the start time will receive an error. Additionally, not allocating enough time to schedule all students selected will produce an error. Particular students can be removed from the block conference by clicking on the trash can next to the student's name (e.g., same process as group conferencing).

Once valid details have been set and the "Create Conferences" option has been selected, a pop-up window will be displayed to confirm the scheduling of multiple conferences. The user can select "Ok" to proceed. In response to this user selection, another pop-up window will be displayed to present a list of the students and their scheduled conference dates and times. The user can select "Close" to proceed back to the 'Students To Be Scheduled' tab as described above. The user can click on a 'Conferences To Be Conducted' tab to schedule students in their own individual conferences at different times as scheduled in block form as described above.

It may be beneficial to double book multiple conferences at the same time. Double booking a conference may be useful if, for example, the district has a high no-show rate. In this case, the user can enter "2" or more in a "# of Students" conference details box as shown in the user interface. After filling out the rest of the details and clicking a "Create Conferences" option, a pop-up window is displayed to confirm for the user that multiple students have been booked for each time slot.

Figure 11:
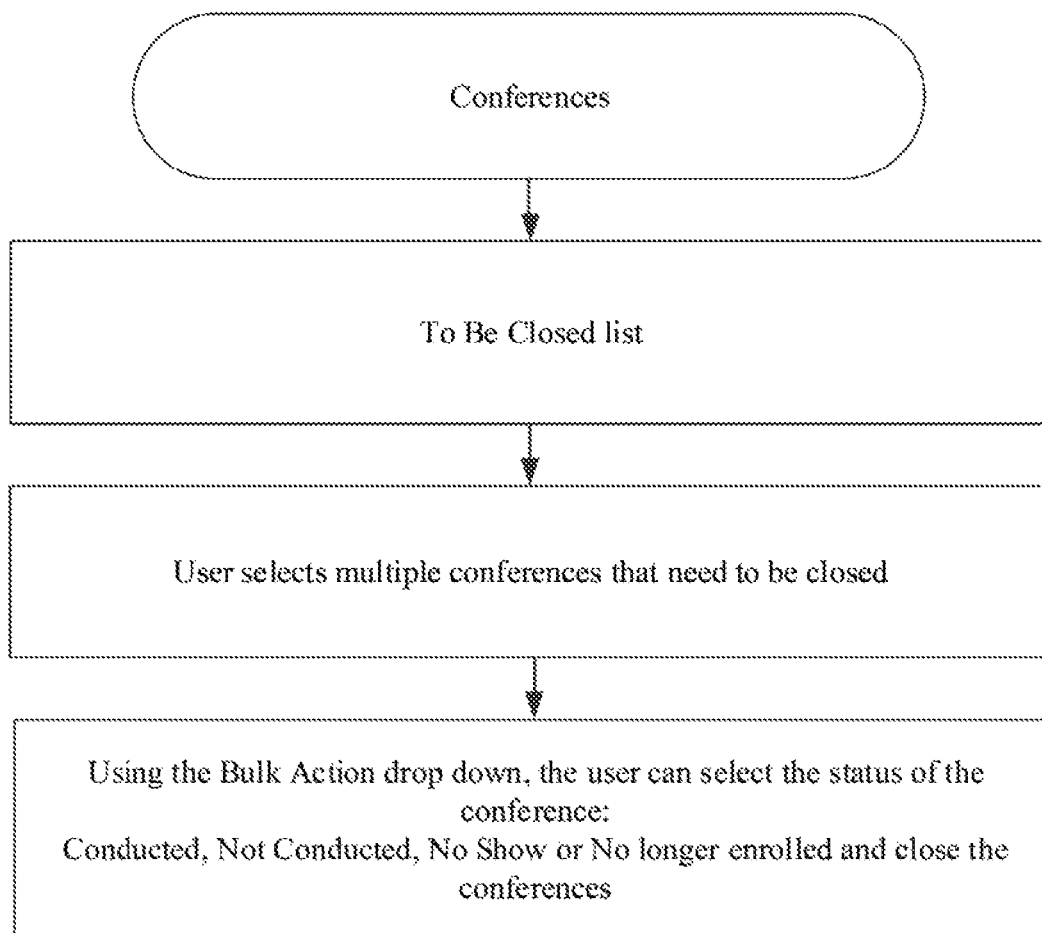
FIG. 11 is an operational or processing flow chart illustrating an example embodiment of a method as described herein for configuring bulk status and conference updates.

Referring now to FIG. 11 in an example embodiment, the Bulk Status and Close Conferences features of an example embodiment are illustrated. FIG. 11 is an operational or processing flow chart illustrating an example embodiment of a method as described herein for configuring bulk status and conference updates. Client users can be frustrated by the amount of 'clicks' or other user interface actions needed to determine status and close out multiple conferences in one sitting. The solution provided by the example embodiments described herein reduces the number of user interface actions required to close out conferences. There is no change to the requirements to close a conference. Conferences can still be closed using the process of clicking on each individual conference as described above. To remove a student from a conference, the user must open the individual conference. In the example embodiment, students cannot be bulk 'Removed From Conferencing' or one click 'Removed From Conferencing'.

As part of the Bulk Status and Close Conferences features of an example embodiment, a user can navigate to a conferences 'To Be Closed' page as shown in the user interface. The user can select the conferences to close out by clicking the boxes to the left of the conference. Then, the user can click on the 'Bulk Actions' button at the top of the conference list. The user can select the appropriate conference status that will be given to all students who were selected. A warning pop-up window can be presented to the user to prompt the user to confirm the status and the selected action of closing the conferences. The user can click 'Yes' and the selected conferences will be closed with the status selected. If the user clicks 'No', no change will occur. Users are also able to close out individual and group conferences directly from the 'To Be Closed' tab without opening the conference by clicking on the 'Close Conference' icon and selecting the status.

Referring now to FIG. 12 in an example embodiment, the Got New Triggers: Got New Absences After Conference Date Before Next Letter Generates features in the example embodiment are illustrated. FIG. 12 is an operational or processing flow chart illustrating an example embodiment of a method as described herein for configuring the Got New Triggers feature. In some circumstances, parent/district relationships can be strained when parents receive a letter of the student's absences directly after meeting together with district representatives and deciding on an attendance plan. As such, an example embodiment provides a feature (denoted the Got New trigger feature) to provide a client with an option to set a variable threshold of new absences that must occur after the district has met with the student before the next truancy letter generates. As shown in the example illustrated in FIG. 12, the feature includes the capability for a user to configure one or more triggers by site or location. In an example embodiment, a user can choose to select a number of absences that the student must incur after the actual conference date as a pre-requisite for the next truancy letter in the sequence (in addition to the letter trigger). The related conference must be CLOSED-'Conducted' or CLOSED-'Removed From Conferencing' for the next letter to generate. The feature is compatible even if the district conferences off multiple letters with multiple closed conference pre-requisites.

In an example embodiment, District A can be configured to send a first letter (L1) to the parents/student at the accrual of three student absences, a second letter (L2) at six absences, and a third letter (L3) at nine absences. For example, the student can receive L2 on Apr. 1, 2015 and is queued up to be scheduled in a conference. In this example, the student can be scheduled for a conference on May 1, 2015, but may miss two more school days in mid-April before his/her conference date. After attending the conference, the student is given a status of 'Conducted' and the conference is closed on May 2, 2015. However, in the example, the student may miss another day of school on May 3, 2015 (two days after the conference). In this example, the student technically has nine absences at this point and without the Got New trigger feature of the example embodiment, the L3 letter would be generated and sent, which may cause confusion and other problems.

In the example embodiment disclosed herein, if the district user chose a Got New trigger of three (3), the student would need to miss three (3) days of school after the conference date (May 1, 2015 in the example above) for the next letter to be automatically generated. For the student in the example described above, the L3 letter would be automatically generated once the student missed eleven days of school.

The Got New trigger feature of the example embodiment can be configured by use of the user interface actions described in more detail below. The user can configure the Got New trigger feature by initially navigating to the A2A Configurator function of the Configuration page from an Administration page. Upon selection of the A2A Configurator function, a user interface page is displayed for the user. At this point, the user can select the desired district from the left hand navigation panel. The user can click on 'District Wide Configuration' or a specific site if the trigger is not district-wide. The user can scroll down to the 'Got New Triggers' section and type the number of absences to be configured in the manner described above and shown in FIG. 12.

Figure 13:
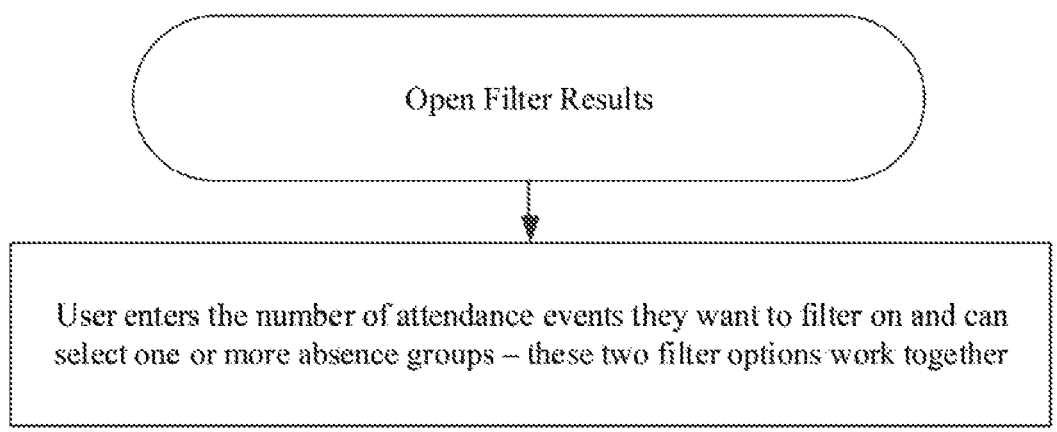
FIG. 13 is an operational or processing flow chart illustrating an example embodiment of a method as described herein for effecting additional student filters.

Referring now to FIG. 13 in an example embodiment, a variety of additional student filter features in the example embodiment are provided. FIG. 13 is an operational or processing flow chart illustrating an example embodiment of a method as described herein for effecting additional student filters. A quantity (Attendance Count) and type (Absence Group) of attendance events can be specified by the user via the user interface. In an example embodiment, the student filters are configured to enable the 'Attendance Count' and the 'Absence Group' to be selected/specified by the user and configured to work together to filter a desired result. In an example embodiment, absence groups are by letter triggers, not reporting type. Only absence groups that are configured will be on display (if the district does not send tardy letters, then this option will not be displayed). The user can hold the 'CTRL' key to select multiple absence groups.

In a first example of the student filters of an example embodiment, the Attendance Count can be set to ten (10) and the Absence Group can be set to Truant. In this example, this filter will return all students with ten or more truant absences.

In a second example of the student filters of an example embodiment, the Attendance Count can be set to ten (10) and the Absence Group can be set to both Truant and EEA. In this second example, the user can enter 10 for the Attendance Count and hold the 'CTRL' key to select the multiple Absence Groups. In this second example, this filter will return all students with a combination of ten or more truant and/or EEA absences.

Figure 14:
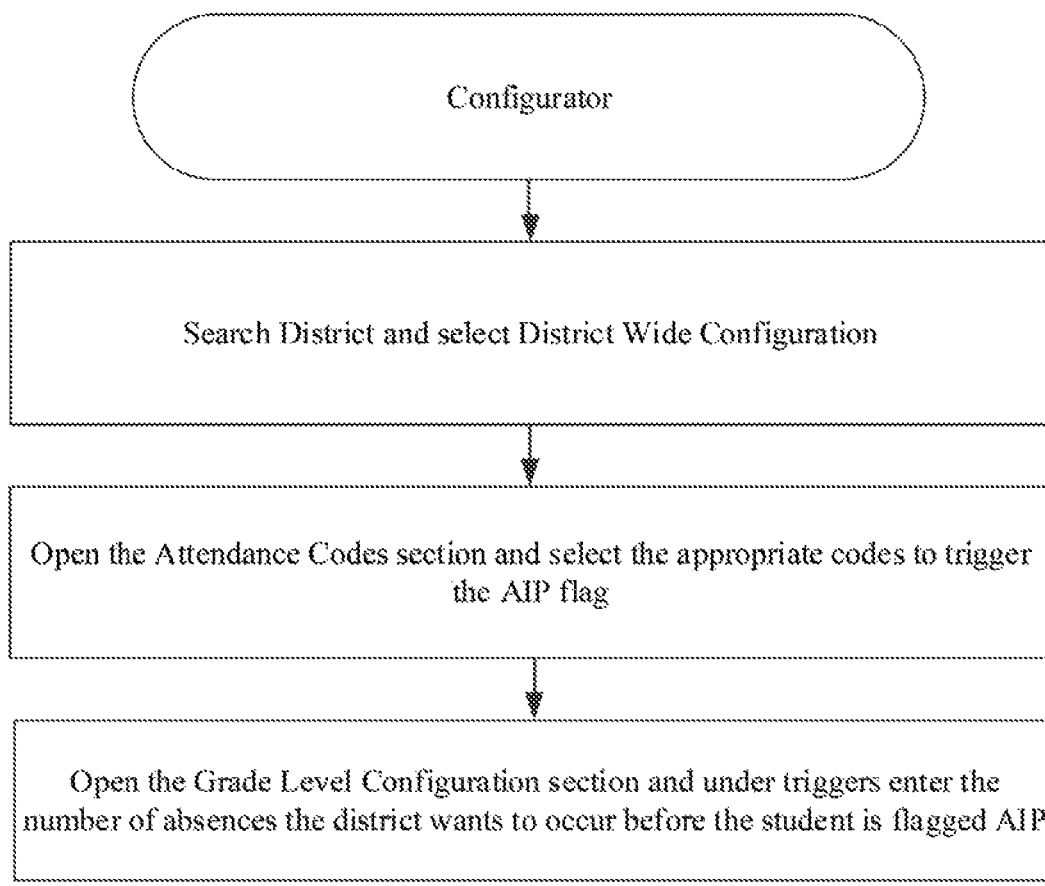
FIG. 14 is an operational or processing flow chart illustrating an example embodiment of a method as described herein for automatic Attendance Improvement Plan (AIP) configuration.

Referring now to FIG. 14 in an example embodiment, the Automatic Attendance Improvement Plan (AIP) Configuration features of an example embodiment are illustrated. FIG. 14 is an operational or processing flow chart illustrating an example embodiment of a method as described herein for automatic Attendance Improvement Plan (AIP) configuration. In an example embodiment, the Attendance Improvement Plan (AIP) flag can be manually turned on and off by navigating the user interface to each individual student's student overview page. As an alternative, the example embodiment allows an operations user to configure the AIP flag to automatically turn on for a district as the students upload on each letter run. In the example embodiment, the automatic AIP flag can be configured by district, site, and/or attendance codes. The automatic AIP flag will only put students on AIP; it does not clear existing AIP flags. Automatic configuration will ignore students that are already on AIP. If attendance is cleared for a student, the AIP flag will not automatically clear. A user must go to the student overview page and manually remove the student from AIP, if necessary. Users can update flags that have been placed on the student automatically. A default configuration will be to set the AIP flag to a value of '0'—no automatic AIP flag.

The Automatic AIP Flag feature of the example embodiment can be configured by use of the user interface actions described in more detail below. The user can configure the Automatic AIP Flag feature by initially navigating to the A2A Configurator function of the Configuration page from an Administration page. Upon selection of the A2A Configurator function, a user interface page is displayed for the user. At this point, the user can search then select the desired district from the left hand navigation panel. The user can click on 'District Wide Configuration' to configure all sites, or select each site individually. Upon selection of the 'District Wide Configuration', a user interface page is displayed for the user. The user can click on the 'Attendance Codes' and configure the Automatic AIP Flag feature using an 'AIP' column provided in the user interface. Based on the district desires and goals, the user can select the appropriate codes to trigger the Automatic AIP flag. The user can double-click, then check a box to select the function. The user can then click 'Save' to save the configured selections.

The user can further navigate to the 'Grade Level Configuration' and select the 'Triggers' function. Upon selection of the 'Triggers' function, a user interface page is displayed for the user. The user can enter the number of AIP absences for which the district wishes to put a student on automatic AIP. Finally, the user can click 'Save' again to retain the configuration.

The Auto AIP flag will most likely need to be set by site if some sites are all day and some are period counting. For example, the district may want nine absences to be the threshold for the Auto AIP function. If the site uses period counting with five periods for a day, for example, then the user would need to increase the AIP trigger accordingly (e.g., to 9×5=45) for that site. Once the site(s) have been configured as described above, the flag will appear on qualified students throughout the user interface. Additionally, the flag is populated during letter generation.

Figure 15:
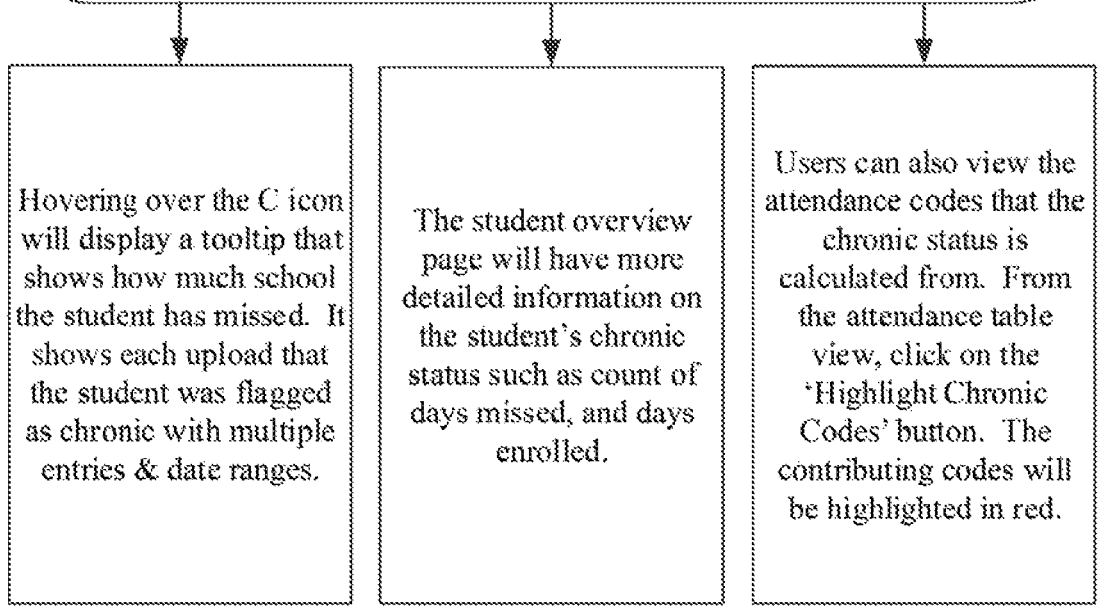
FIG. 15 is an operational or processing flow chart illustrating an example embodiment of a method as described herein for effecting a chronic student absence flag.

Referring now to FIG. 15 in an example embodiment, the Chronic Student Flag in the user interface of an example embodiment is illustrated. FIG. 15 is an operational or processing flow chart illustrating an example embodiment of a method as described herein for effecting a chronic student absence flag. In the example embodiment, the Chronic status indicator is provided in the user interface so users can readily see at a glance which students are chronically absent. This allows the user to focus on the chronic student population for more specifically directed interventions. In the example embodiment, the chronic indicators will only be as accurate as the last letter run. The data will be refreshed in concert with the print schedule. If the student is not considered chronically absent in the current letter run, the student will not have a chronic icon displayed in the user interface, even if the student did in prior letter runs. In an example embodiment, Chronically Absent is defined as a student who has missed 10% or more of days enrolled. Once a student has missed 10% or more of school days enrolled, the system automatically flags the student with a red 'C' icon (e.g., the Chronic status indicator) to the right of the student name and ID. The flag appears next to the student name in all pages of the application (Students Page, Letters Pages, Conferencing Pages, etc.).

As shown in FIG. 15, hovering over the icon (e.g., the Chronic status indicator) displays a tooltip that shows how much school the student has missed, represented as a percentage (%) of school days enrolled that have been missed. The tooltip will show each upload for which the student was flagged as chronic with multiple entries and date ranges. For example, a particular student may have only been flagged as chronic once. Another student may have been flagged multiple times and we can view the history and percentage of enrolled days missed each time the student was flagged.

A student overview page, in an example embodiment, displays detailed information on the student's chronic status, such as a count of days missed, and days enrolled.

Users can also view the attendance codes from which the chronic status is calculated. From the attendance table view, the user can click on the 'Highlight Chronic Codes' button. The contributing codes will be highlighted. Users may filter the information displayed in the user interface by chronic status from the list pages (Students Page, Letters Pages, and Conferencing Pages).

Reports

Figure 16:
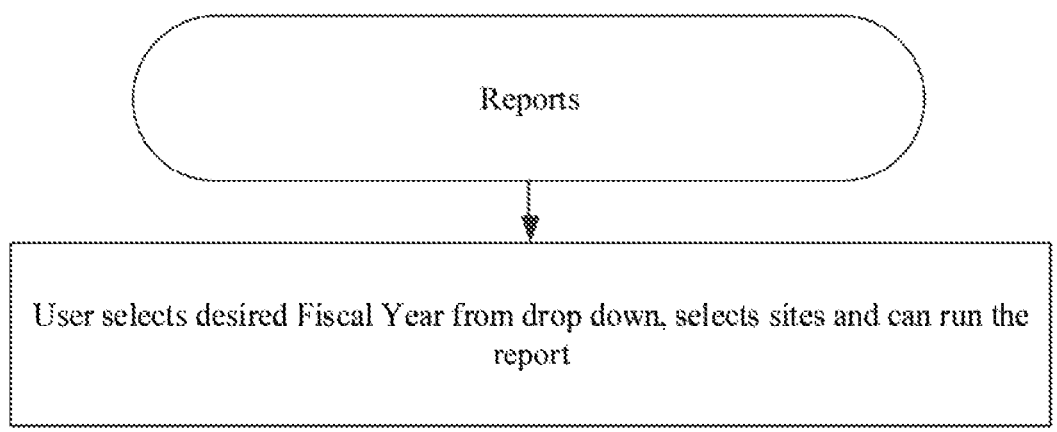
FIG. 16 is an operational or processing flow chart illustrating an example embodiment of a method as described herein for generating a fiscal year report.

Referring now to FIG. 16 in an example embodiment, the features of the Client Reports—Fiscal Year Filter of an example embodiment are illustrated. FIG. 16 is an operational or processing flow chart illustrating an example embodiment of a method as described herein for generating a fiscal year report. In an example embodiment, a feature is provided with which clients can run all client-facing reports in the user interface for multiple years. Clients can start running reports from the 2014-15 school year onward. Only years the district was active on A2A will be available for selection. If the district started A2A in the 2015-16 school year, the district will only be able to view and select 2015-16 from the drop-down filter as shown in the user interface.

Figure 17:
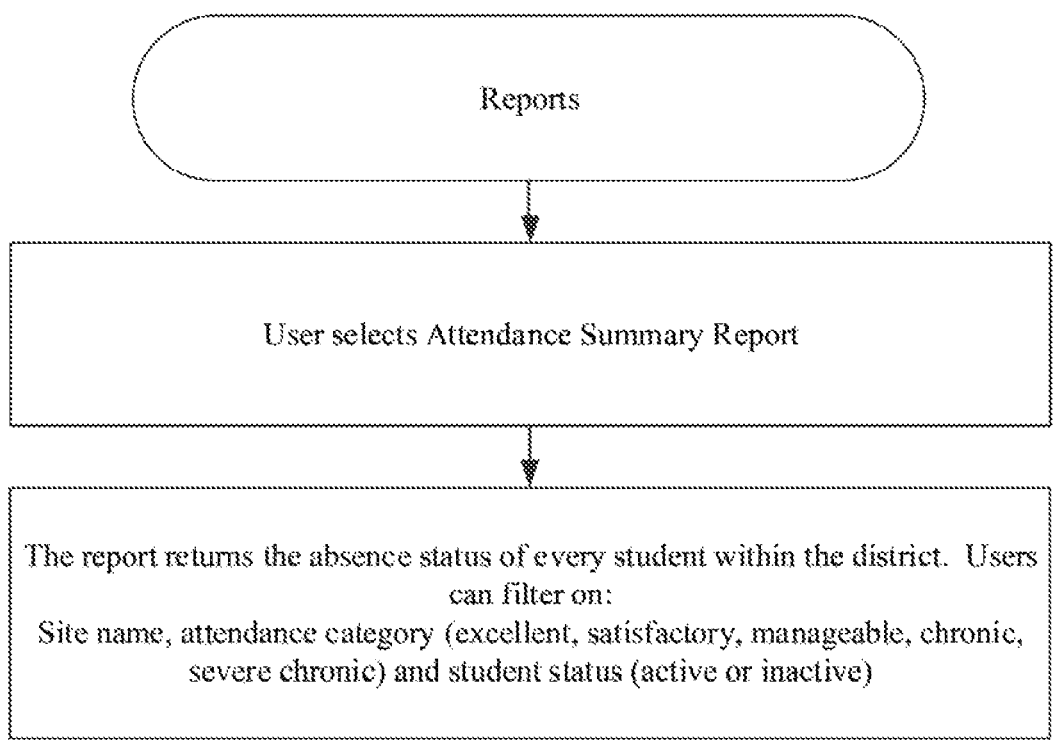
FIG. 17 is an operational or processing flow chart illustrating an example embodiment of a method as described herein for generating an attendance summary report.

Referring now to FIG. 17 in an example embodiment, the Attendance Summary Report in the user interface of the example embodiment is illustrated. FIG. 17 is an operational or processing flow chart illustrating an example embodiment of a method as described herein for generating an Attendance Summary Report. The example embodiment is configured to provide a client-facing report as part of the user interface, wherein users can run (on demand) a report to list and display key student information. This information allows district users to easily identify students that need targeted interventions, or to reward students with great attendance. The report also helps districts fulfill state education report requirements. The Attendance Summary Report provides attendance information that is as current as the client's last attendance through the date from their production schedule, which provides district users with time relevant knowledge about each student's attendance behavior. In the example embodiment, users can filter the displayed information by: site name, attendance category (excellent, satisfactory, manageable, chronic, and severe chronic), and student status.

Figure 18:
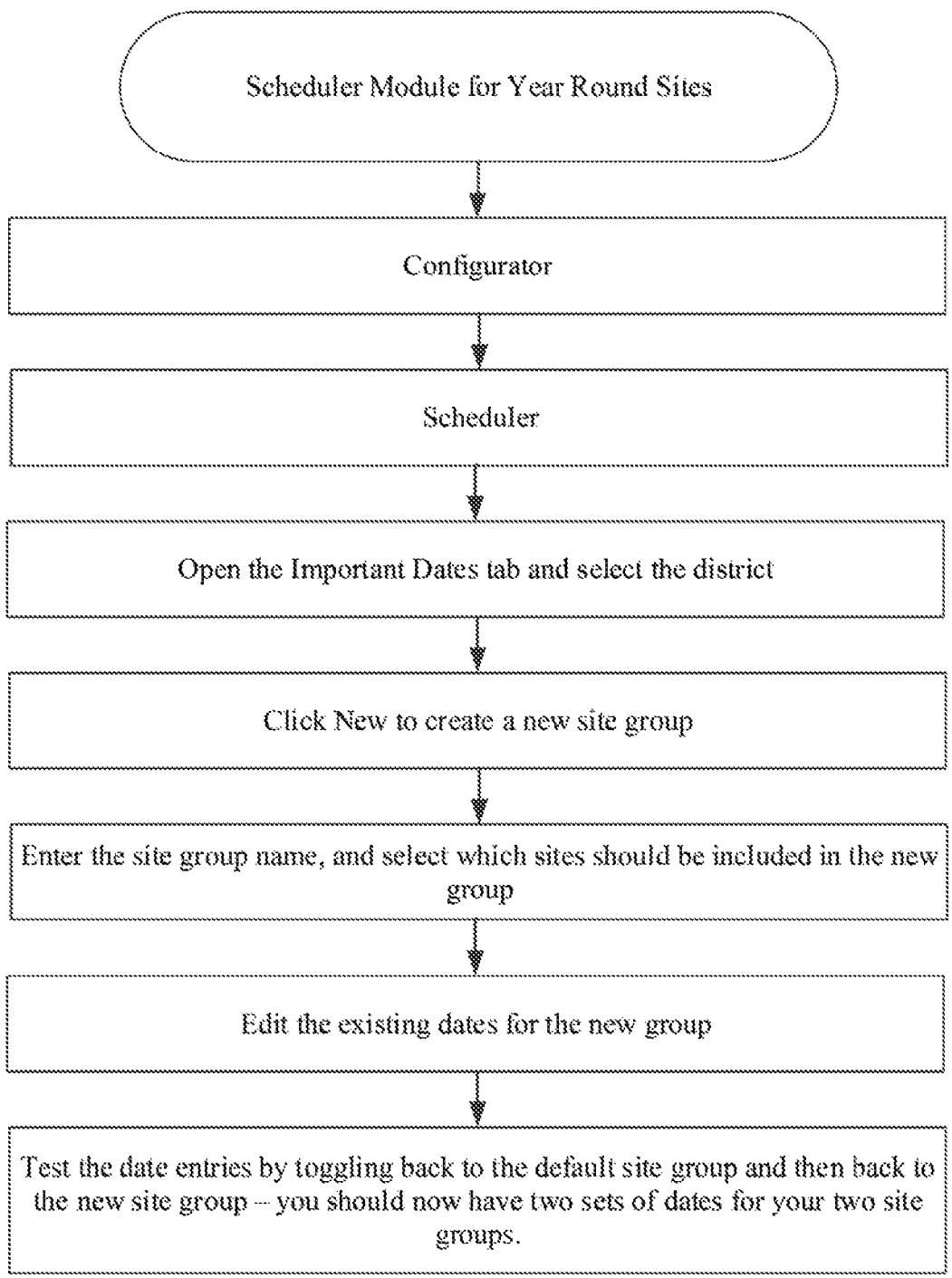
FIG. 18 is an operational or processing flow chart illustrating an example embodiment of a method as described herein for effecting updates to important dates to accommodate year-round sites.

Referring now to FIG. 18 in an example embodiment, the Important Dates Update to Accommodate Year Round Sites features of an example embodiment are illustrated. FIG. 18 is an operational or processing flow chart illustrating an example embodiment of a method as described herein for effecting updates to important dates to accommodate year-round sites. Many A2A districts have sites with differing school calendars. There can be districts with traditional school calendars as well as sites with year-round school calendars. There can also be districts that allow sites to choose black out days that may occur on different dates. In an example embodiment, a capability is provided to add and configure multiple important date schedules by site.

The feature of the example embodiment for managing multiple important date schedules by site can be configured by use of the user interface actions described in more detail below. The user can configure the date schedules by site feature by initially navigating to the Scheduler function of the Configuration page from an Administration page. Upon selection of the Scheduler function, a user interface page can be displayed for the user. At this point, the user can click on the 'Important Dates' tab and select a desired district. The user can then click on the 'New' button to create a new site group. A display area is presented in the user interface under the selected district called 'Add New Site Group Date'.

As an example of the embodiment disclosed herein, a user can be working with a particular district (e.g., Hayward USD), which has four year round sites and the rest of the sites in the district have traditional school calendars. In this example, the user can leave the default school year as the year round dates of Jul. 21, 2014-Jun. 11, 2015. Next, the user can click on a 'New' button to create the important date entries for the traditional sites. The user can click on the 'New' button and enter the site group name. The site group name should not have any spaces. The new site group name can be specified by the user as 'Traditional_Sites.' It will be apparent to those of ordinary skill in the art that any arbitrary name for the new site group can be entered by the user.

The user can select which sites are included in this new group (denoted in the example as 'Traditional_Sites') by checking the sites to include. The user can scroll down to the bottom of the site list and click 'SAVE' to retain the site selection.

The user can add and edit the existing dates for the 'Traditional_Sites' group. The end result is an edited school year to start in August with a blackout date specifically configured for the Traditional_Sites site group of the example as described. The user can test the date entries by toggling back to the 'Default' site group and then back to the new site group. As described for these examples, there are now two sets of dates for the two defined site groups: 'Default' and 'Traditional_Sites.' In this manner, the example embodiment enables the user to define and configure a variety of site groups to manage the various school calendars and important dates at sites within a district.

The user can delete a site group by picking the desired site group from the drop-down Site Group menu, navigating to the bottom of the site list, and selecting the delete button. A confirmation prompt can also be displayed to the user.

Figure 19:
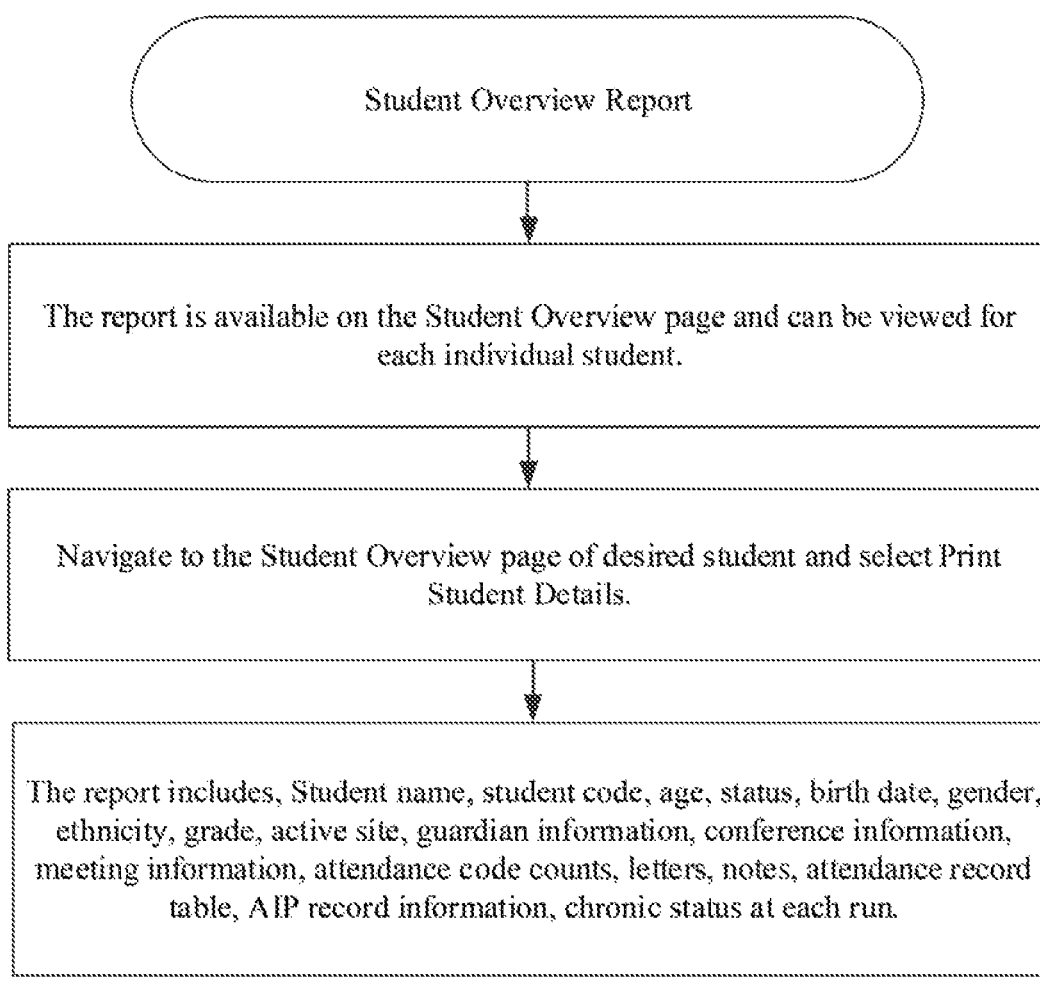
FIG. 19 is an operational or processing flow chart illustrating an example embodiment of a method as described herein for generating a student overview report.

Referring now to FIG. 19 in an example embodiment, the Student Overview Report features of an example embodiment are illustrated. FIG. 19 is an operational or processing flow chart illustrating an example embodiment of a method as described herein for generating a student overview report. In an example embodiment, an updated version of the student overview report is available for clients to access through the user interface. The Student Overview Report is available for each individual student and shows all pertinent information regarding the student and their attendance. For example, the Student Overview Report can be configured to present among the following items of information via the user interface:

Student Information (name, student code, age, student status, birth date, gender, ethnicity, grade, active site, etc.)
Guardian Information (name, language, home phone, email, send email, address, etc.)
Conference Information (conference status, conference date, letter, location, etc.)
Meeting Information (meeting date, meeting type, meeting location, etc.)
Attendance Code Counts by type, code, and description
Letters (date, absences, letter, status, site, etc.)
Notes (date, comments, etc.)
Attendance Records Table (site, date, period, attendance code, etc.)
AIP Record Information
Table of chronic status at each run The user can navigate to the Student Overview page of a desired student via the user interface and select an 'Open Student Overview Report' option from the dropdown menu. A PDF file of the report can be downloaded for the user to open and print.

In an example embodiment, users can see a summary of chronic absence percentages over time. Users can filter the report to drill down to a particular site, grade, ethnicity, or even down to each student.

Letters

Referring now to FIG. 20 in an example embodiment, the Changes to Optional Letter Configuration—Selecting Prior Optional Letter Run features of an example embodiment are illustrated. FIG. 20 is an operational or processing flow chart illustrating an example embodiment of a method as described herein for effecting changes to optional letter configurations. The example embodiments provide some changes to the optional letter configuration features for selecting a prior optional letter run. The example embodiment provides the ability to send optional letters to a group of students who previously received an optional letter. This feature can be used for Attendance Improvement (AI) Tipping Point letters where two optional letters can be sent to the same group of students in a given school year. For example, the user can access the Optional Letter Dashboard in the user interface and click on the 'New' button to display the configuration page. From the configuration page, the user can select a previous optional letter run from the drop-down 'Follow-up Letter to' (the list-box will only show runs for the district selected). User selection and running of a follow-up letter will affect the previous student list in the following ways:

Removes students who are no longer active.
Updates guardian address fields with any changes.
Gives student attendance information including (chronic category, percent of school year missed, number of student instructional days, number of days missed, attendance start date, attendance through date, number of absences prior to last letter, and number of absences since last letter).

Back-End/Database Enhancements

In an example embodiment, the back-end system and database enhancements provides a variety of new features. A few of these features are listed below:

Student chronic absenteeism levels can be calculated during upload to the database—Student chronic absenteeism levels (Chronic, Manageable, Satisfactory, and Excellent) can be calculated each time a district uploads its truancy data. The Report Repository can use this calculation instead of calculating on its own so the chronic levels for each student will match up as long as they are run with the same attendance through date.
Year over year student tracking logic can be implemented in the database—An ID is provided in the database to link one student year over year. A user can follow distinct students year-over-year within a district.
Former A2A client data can be anonymized in the database—An administrator can anonymize identifiable (student/faculty) data. This includes inbound data, stored data, as well as backups.
The database can be configured to support fiscal year handling—Fiscal year handling to A2A back-end configuration tables is provided in the database, as well as to the configurators in the administration screens. The example embodiment can account for configuration changes made each year, which will benefit all year over year reporting.

In an example embodiment, a configuration utility separate from the 'District Configurator' is provided as part of the administration section of A2A. This configuration utility is called the 'Code Configurator'. The Code Configurator can be used to map code definitions for additional data elements that an administrator may want to report on for A2A clients. The configuration utility enables normalization of the data between all clients for comparison. Codes from the District Configurator can be moved over to the Code Configurator so that all codes for a given district can be configured in the same area. Attendance codes can be housed in the District Configurator as they have a direct tie to letter generation.

Additional Features

In the various embodiments described herein, the system and method for student attendance management can be further configured to provide the additional features described below.

Course Schedules

In an example embodiment, the student attendance management system 200 is configured to include student level course schedule information. The student attendance management system 200 can be configured to collect information such as course code and course name, and link the student level course schedule information to each student's attendance data.

For example, an example embodiment can determine and list the student level course schedule information for a particular student along with the student's absence information. For example, the example embodiment can display that the particular student had an unexcused absence in period 1 on June 8th, and that the class they missed was Math. The student level course schedule information is pulled into the student attendance management system 200 using the site-resident data collection module 210 and the same methodology that all other student and attendance data uses. Example embodiments have the flexibility to turn course schedules on or off by district. Currently, the course information is displayed in the Student Overview Page, described above, where the district or site user can toggle course information on or off. The course information displays with the attendance information. Course information can also be displayed in a pie chart to summarize what courses were missed. When the computer mouse hovers over each color of the pie chart, a tooltip appears to indicate the course type and the count of absences.

An example embodiment includes a configuration that allows the operations team to configure each period for normalized reporting. Configuration can be applied by district, site, fiscal year, and district course code. For example, a course Math 105-B can be configured to be labeled simply as 'Math'. This way, an example embodiment can provide reporting by core subjects (e.g., Math, Science, English or Language Arts, Social Studies, Foreign Language, and Other) back to the district as well as compare attendance at multiple sites or districts.

Fiscal Year Dropdown in Student Overview Page

Districts frequently request the ability to view student level information year over year from within the user interface of the student attendance management system 200. To fulfill this request, an example embodiment includes a fiscal year filter within the Student Overview Page where the user can toggle back and forth between years. The client is able to access and view all student and attendance information for the same student across multiple years with the click of a button.

Calendar View

In an effort to better display attendance information for consumption, an example embodiment can be configured to allow the district or site user to view a student's attendance in a calendar format in addition to the existing table view. This allows the user a new perspective to easily digest attendance trends by student on a given day, week or month. This feature also allows the administrator to filter based on letter, attendance code and chronic status (same as the existing attendance table).

Meeting Ad Hoc Conferencing Feature

An example embodiment can be further configured to include a function for documenting a meeting that allows the district or site user to close an associated conference for a given student and document the meeting at the same time. If the user decides to close the conference, the student meeting will be marked as conducted on the back-end. If the student was already in a scheduled group conference, the system will automatically convert them to an individual conference.

Bookmarking a Student

To provide an ease of use to our clients, an example embodiment includes a bookmark feature that allows district users to save students to the left navigation bar. This feature will benefit users who are monitoring specific students, as the students they bookmark will always show up on the left navigation bar every time the user logs in.

Chronic Letters

An example embodiment can be further configured to include a feature for generating a chronic absence letter to be sent once a student misses 10% of the school year (with at least 9 full day equivalent absences). This feature provides a letter option that can be configured should a district sign up for this letter type. The trigger of 10% with at least 9 full day equivalent absences is a recommended configuration for sending chronic letters; however, the example embodiment provides a mechanism to adjust the percentage of the year missed in combination with a whole number integer of absences. The example embodiment enables this trigger adjustment to be configurable by district, site, and/or grade.

Letter Attendance Window

An example embodiment can be further configured to support the generation of specific letters based on attendance during a specific period of time. For example, a district may implement a letter of type 'mid-year' if it only wants to send off attendance from that point forward to avoid a large influx of letters triggered off past attendance. This feature is also helpful for configuring special letters that are only sent to students at the beginning of the year.

Configurable Student Age Letter Triggers

California compulsory attendance requires students to attend school from ages 6 to 18. The student attendance management system 200 can be configured to handle exclusion of students outside of this age range from receiving letters. However, the compulsory attendance laws vary across states; the starting age can range from 5 to 7 years old, and the ending age ranges from 16 to 18 years old. The student attendance management system 200 can be configured to support the particular districts according to compulsory education laws that apply to the given state. Additionally, an example embodiment includes the ability for our internal users to edit age triggers.

Period Configuration Utility

An example embodiment can be further configured to support an expanded district configuration by adding sections that allow an internal operations team to manage and manipulate attendance periods by year, district, site, and even grade code. This allows the example embodiment to be compatible with all unique attendance methods encountered thus far. This configuration is essential to the operations team as there are many sites that have unique attendance practices. There are many unique attendance practices and manipulations that happen in the raw data the student attendance management system 200 receives from various districts. This period configuration feature allows the student attendance management system 200 to adjust for these instances so that our district and site users will always see the attendance as they entered it, and the letters will generate off the correct attendance as well. In various embodiments, the period configuration feature can be used for:

Designating one period as all day;

Shifting periods or renaming periods;

Flagging periods to trigger/not trigger letters and chronic calculations;

Flagging periods to display/not display in the user interface; and

Designating a period range.

This is not a limited list as the example embodiments may come across more unique attendance configurations as more clients are gained. This period configuration feature is built to be flexible and different configurations can be applied without changing the basic framework of the system. Just like all other configuration utilities of the various example embodiments, the period configuration feature only needs to be set up once upon district implementation and maintained annually.

My Dashboard Feature

An example embodiment can be further configured to support a user interface denoted 'My Dashboard'. This user interface feature allows district and site end users to build their own reports using student and attendance data to fulfill unique needs. For example, the following capabilities are provided by the 'My Dashboard' user interface feature:

Users may build and create their own charts/reports;

Users may save reports they created to a 'Favorites' section;

Users may delete and reorganize reports they built;

District specific reports can be stored and shared between users at that district;

The operations team can build and display reports to end users; and

Help tooltips and messages throughout the My Dashboard user interface feature assist and guide users in building their own reports.

Fiscal Year Filter for Interactive Reports

An example embodiment can be further configured to support 'Fiscal Year' filters to both client facing Interactive Reports: Interactive Chronic Absenteeism Analysis and Attendance Analysis Reports. This filter allows a user to access prior year reports to view trends based on attendance data.

Monthly Filter for Interactive Reports

An example embodiment can be further configured to support a filter added to interactive reports to allow clients the ability to view attendance trends by month or attendance through date. This feature has been provided to align with state reporting requirements as well as provide a metric for future year over year reports in the user interface.

Client Site Verification Report

An example embodiment can be further configured to support a client site verification report. This internally accessed report can be created for the operations team to export and send to clients in order to verify important configuration details. This report is part of our verification process at the start of each school year with existing clients, or with new client implementations. The report is purposefully formatted in an easily digestible format with directions so that clients can easily review and send back to confirm their configuration details.

Monthly Chronic Calculation Logic

An example embodiment can be further configured to calculate each student's chronic absence level during data upload and letter generation. As a result, monthly chronic absence calculations can be performed down to the student level. The student attendance management system 200 can leverage this data by allowing monthly filters in the user interface reports as well as monthly analysis on reports prepared for clients.

Automated End of Year Data Pull Run

Most districts stop their letter runs about a month before the end of school. This means that the last data pull is out of date once the end of the school year is reached. To remedy this, an example embodiment can be configured to manually or automatically pull an updated data set a week after the end of school for each district. In example embodiments, the timeframe for performing the manual or automatic data pull after the end of school for each district is configurable and adjustable. This manual or automatic data pull at the configured time allows us to have a full year's worth of data, which is imperative to have for reporting. To streamline these 'End of Year Data Pulls', an example embodiment can be configured to update our scheduler module so that a manual or automatic data pull is no longer needed. An example embodiment can be configured to update the internal scheduler module so that the end of year data pull for each district is automatically added to the production schedule when it is created by the operations team. This streamlines the end of year data pulls by eliminating the need for the operations team to manually enter end of year runs into the scheduler module for each district.

In the various embodiments described herein, a system and method for student attendance management are disclosed. The various embodiments provide the ability to detect chronic absenteeism early, and then intervene or deter chronic absenteeism. The various embodiments standardize student attendance records of all schools within a school district and all districts in a given area, automatically track absences on a daily basis, and provide automatic and prompt notification when an individual student's truancy reaches a threshold requiring a response.

In various embodiments described herein, a software application program is used to gather, process, and distribute school information, including attendance data, using a computer system, a web appliance, a mobile device, and a data network. As described in more detail herein, the computer or computing system on which the described embodiments can be implemented can include personal computers (PCs), portable computing devices, laptops, tablet computers, personal digital assistants (PDAs), personal communication devices (e.g., cellular telephones, smartphones, or other wireless devices), network computers, set-top boxes, consumer electronic devices, or any other type of computing, data processing, communication, networking, or electronic system. In the described embodiments, a data network ecosystem enabled via a wide area data network (e.g., the Internet) enables the various components of the system to communicate internally via a conventional wide area data network and/or an intranet or local area network (LAN). As a result, the various embodiments described herein are necessarily rooted in computer and network technology and serve to improve these technologies when applied in the manner as presently claimed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method comprising:
   installing a site-resident data collection module in a legacy site location, the legacy site-resident data collection module including instructions executing within an executable environment of the legacy site location, the site-resident data collection module further including a first data interface enabling data communication between the site-resident data collection module and a legacy data processing system of the legacy site location, the site-resident data collection module being configured to dynamically determine database record structures and record attributes being used by the legacy system, the site-resident data collection module being configured to interface with and collect data from a plurality of different legacy data processing systems;
   using the site-resident data collection module to collect site-specific information including student attendance data, and other site data from the legacy site location;
   transferring the site-specific information to a host location via a data network;
   performing, by a data processor, data transformation and normalization operations on the site-specific information to convert the site-specific information to a common format, the data transformation and normalization operations including district-specific data transformation rules;
   performing, by the data processor, district configuration operations to configure rules specifying how and when alerts can be sent to recipients based on the site-specific information;
   performing, by the data processor, scheduling and reporting operations to generate and distribute alerts, including attendance letters, to recipients based on the site-specific information and the configured rules;
   linking, by the data processor, student level course schedule information to the student attendance data;
   generating, by the data processor, a chronic student absence letter triggered by a chronic student absence trigger indicative of when a student has been absent a pre-defined percentage or more of school days enrolled, the chronic student absence trigger being configurable based on a specific district, site, and grade, the chronic student absence trigger being further configurable based on an attendance time window, the attendance time window corresponding to whether the pre-defined percentage of absences occur within a specific set of school days enrolled; and
   configuring, by the data processor, a student age letter suppression trigger causing suppression of letter generation for students of an age outside of a pre-determined age range, the student age letter suppression trigger being configurable based on a specific district, state, and user.

2. The method of claim 1 including presenting the student level course schedule information with the student attendance data in a user interface.

3. The method of claim 1 including presenting the student attendance data in a calendar view in a user interface.

4. The method of claim 1 including enabling a user to close an associated conference for a particular student and document a meeting at the same time.

5. The method of claim 1 including providing a user interface dashboard to enable a user to generate custom reports using the student attendance data.

6. The method of claim 1 including providing a filter to allow a user to view attendance trends by year, fiscal year, month, or an attendance through date.

7. A system comprising:
   a data processor;
   a network interface, in data communication with the data processor, for communication on a data network; and
   a student attendance management system, executable by the data processor, to:
     cause installation of a site-resident data collection module in a legacy site location, the legacy site-resident data collection module including instructions executing within an executable environment of the legacy site location, the site-resident data collection module further including a first data interface enabling data communication between the site-resident data collection module and a legacy data processing system of the legacy site location, the site-resident data collection module being configured to dynamically determine database record structures and record attributes being used by the legacy system, the site-resident data collection module being configured to interface with and collect data from a plurality of different legacy data processing systems;
     interface with the site-resident data collection module to collect site-specific information including student attendance data, and other site data from the legacy site location;
     cause transfer of the site-specific information to a host location via a data network;
     perform data transformation and normalization operations on the site-specific information to convert the site-specific information to a common format, the data transformation and normalization operations including district-specific data transformation rules;
     perform district configuration operations to configure rules specifying how and when alerts can be sent to recipients based on the site-specific information;
     perform scheduling and reporting operations to generate and distribute alerts, including attendance letters, to recipients based on the site-specific information and the configured rules;
     link student level course schedule information to the student attendance data;
     generate a chronic student absence letter triggered by a chronic student absence trigger indicative of when a student has been absent a pre-defined percentage or more of school days enrolled, the chronic student absence trigger being configurable based on a specific district, site, and grade, the chronic student absence trigger being further configurable based on an attendance time window, the attendance time window corresponding to whether the pre-defined percentage of absences occur within a specific set of school days enrolled; and
     configure a student age letter suppression trigger causing suppression of letter generation for students of an age outside of a pre-determined age range, the student age letter suppression trigger being configurable based on a specific district, state, and user.

8. The system of claim 7 being further configured to present the student level course schedule information with the student attendance data in a user interface.

9. The system of claim 7 being further configured to present the student attendance data in a calendar view in a user interface.

10. The system of claim 7 being further configured to enable a user to close an associated conference for a particular student and document a meeting at the same time.

11. The system of claim 7 being further configured to provide a user interface dashboard to enable a user to generate custom reports using the student attendance data.

12. The system of claim 7 being further configured to provide a filter to allow a user to view attendance trends by year, fiscal year, month, or an attendance through date.

13. A non-transitory machine-useable storage medium embodying instructions which, when executed by a machine, cause the machine to:

cause installation of a site-resident data collection module in a legacy site location, the legacy site-resident data collection module including instructions executing within an executable environment of the legacy site location, the site-resident data collection module further including a first data interface enabling data communication between the site-resident data collection module and a legacy data processing system of the legacy site location, the site-resident data collection module being configured to dynamically determine database record structures and record attributes being used by the legacy system, the site-resident data collection module being configured to interface with and collect data from a plurality of different legacy data processing systems;

interface with the site-resident data collection module to collect site-specific information including student attendance data, and other site data from the legacy site location;

cause transfer of the site-specific information to a host location via a data network;

perform data transformation and normalization operations on the site-specific information to convert the site-specific information to a common format, the data transformation and normalization operations including district-specific data transformation rules;

perform district configuration operations to configure rules specifying how and when alerts can be sent to recipients based on the site-specific information;

perform scheduling and reporting operations to generate and distribute alerts, including attendance letters, to recipients based on the site-specific information and the configured rules;

link student level course schedule information to the student attendance data;

generate a chronic student absence letter triggered by a chronic student absence trigger indicative of when a student has been absent a pre-defined percentage or more of school days enrolled, the chronic student absence trigger being configurable based on a specific district, site, and grade, the chronic student absence trigger being further configurable based on an attendance time window, the attendance time window corresponding to whether the pre-defined percentage of absences occur within a specific set of school days enrolled; and configure a student age letter suppression trigger causing suppression of letter generation for students of an age outside of a pre-determined age range, the student age letter suppression trigger being configurable based on a specific district, state, and user.

14. The machine-useable storage medium of claim 13 being further configured to present the student level course schedule information with the student attendance data in a user interface.

* * * * *